US012668245B2

(12) United States Patent
Yuan

(10) Patent No.: US 12,668,245 B2
(45) Date of Patent: Jun. 30, 2026

(54) VEHICLE CONTROL FOR AUTONOMOUS DRIVING VEHICLE FOR SMOOTH DRIVE-OFF

(71) Applicant: Apollo Autonomous Driving USA LLC, Sunnyvale, CA (US)

(72) Inventor: Baoping Yuan, Sunnyvale, CA (US)

(73) Assignee: Apollo Autonomous Driving USA LLC, Sunnyvale, CA (US)

( * ) Notice: Subject to any disclaimer, the term of this patent is extended or adjusted under 35 U.S.C. 154(b) by 211 days.

(21) Appl. No.: 18/391,320

(22) Filed: Dec. 20, 2023

(65) Prior Publication Data

US 2025/0018947 A1 Jan. 16, 2025

Related U.S. Application Data

(63) Continuation-in-part of application No. 18/297,594, filed on Apr. 7, 2023, now Pat. No. 12,539,860.

(51) Int. Cl.
*B60W 60/00* (2020.01)
*B60W 30/18* (2012.01)

(52) U.S. Cl.
CPC .. *B60W 30/18159* (2020.02); *B60W 60/0013* (2020.02); *B60W 60/0015* (2020.02); *B60W 2710/0666* (2013.01); *B60W 2710/18* (2013.01)

(58) Field of Classification Search
CPC ....... B60W 30/18159; B60W 60/0013; B60W 60/0015; B60W 2710/0666; B60W 2710/18; B60W 2520/105; B60W 2520/30; B60W 2552/15; B60W 30/18027; B60W 10/04; B60W 10/18; B60W 30/18118

USPC .......................................................... 701/23
See application file for complete search history.

(56) References Cited

U.S. PATENT DOCUMENTS

| | | | |
|---|---|---|---|
| 6,577,942 B1 | 6/2003 | Moore | |
| 2007/0001510 A1 | 1/2007 | Miller | |
| 2010/0185368 A1* | 7/2010 | Schneider ............. | B60W 10/02 701/53 |

(Continued)

FOREIGN PATENT DOCUMENTS

| | | |
|---|---|---|
| AU | 2014316433 A | 2/2016 |
| CN | 115230733 A | 6/2024 |
| JP | 2004058937 A | 2/2004 |

OTHER PUBLICATIONS

U.S. Appl. No. 18/484,814—Notice of Allowance and Fees Due(PTOL-85) dated May 27, 2025.

(Continued)

*Primary Examiner* — B M M Hannan
(74) *Attorney, Agent, or Firm* — Oppedahl Patent Law Firm LLC

(57) ABSTRACT

Smooth and agile acceleration of an autonomous driving vehicle (ADV) that is being held at a standstill or is otherwise at a stop is important for ADV safety, efficiency, and occupant enjoyment. For example, as a practical matter, an ADV at an uncontrolled intersection should quickly and smoothly drive-off when it is its turn to advance—otherwise, it may get stuck at the intersection. Embodiments herein provide systems and methods to facilitate a pleasant and comfortable ride while having the ADV drive off smoothly (e.g., not a large jerk) and safely while driving from a stop—regardless of whether the ADV is on a sloped surface.

20 Claims, 28 Drawing Sheets

(56)　　　　　References Cited

U.S. PATENT DOCUMENTS

| | | | |
|---|---|---|---|
| 2010/0190605 A1* | 7/2010 | Petzold ........... | B60W 30/18054 |
| | | | 477/111 |
| 2012/0072065 A1* | 3/2012 | Minamikawa ......... | B60K 6/547 |
| | | | 903/903 |
| 2012/0220422 A1* | 8/2012 | Wurthner .............. | B60W 10/06 |
| | | | 477/79 |
| 2013/0296130 A1* | 11/2013 | Banker ..................... | B60L 7/26 |
| | | | 477/209 |
| 2013/0297120 A1* | 11/2013 | Reed .................. | B60L 15/2045 |
| | | | 903/902 |
| 2013/0297121 A1* | 11/2013 | Reed ..................... | B60W 20/00 |
| | | | 180/65.265 |
| 2018/0297475 A1* | 10/2018 | Zhao ......................... | B60L 7/18 |
| 2020/0398844 A1* | 12/2020 | Ruybal ................ | B60W 10/08 |
| 2021/0189980 A1* | 6/2021 | Parsels ............... | F02D 41/3058 |
| 2022/0080971 A1* | 3/2022 | Bolger ............... | B60W 30/182 |

OTHER PUBLICATIONS

U.S. Appl. No. 18/349,912—Non-Final Rejection dated Feb. 14, 2025.

* cited by examiner

300

Rolling Speed

800B

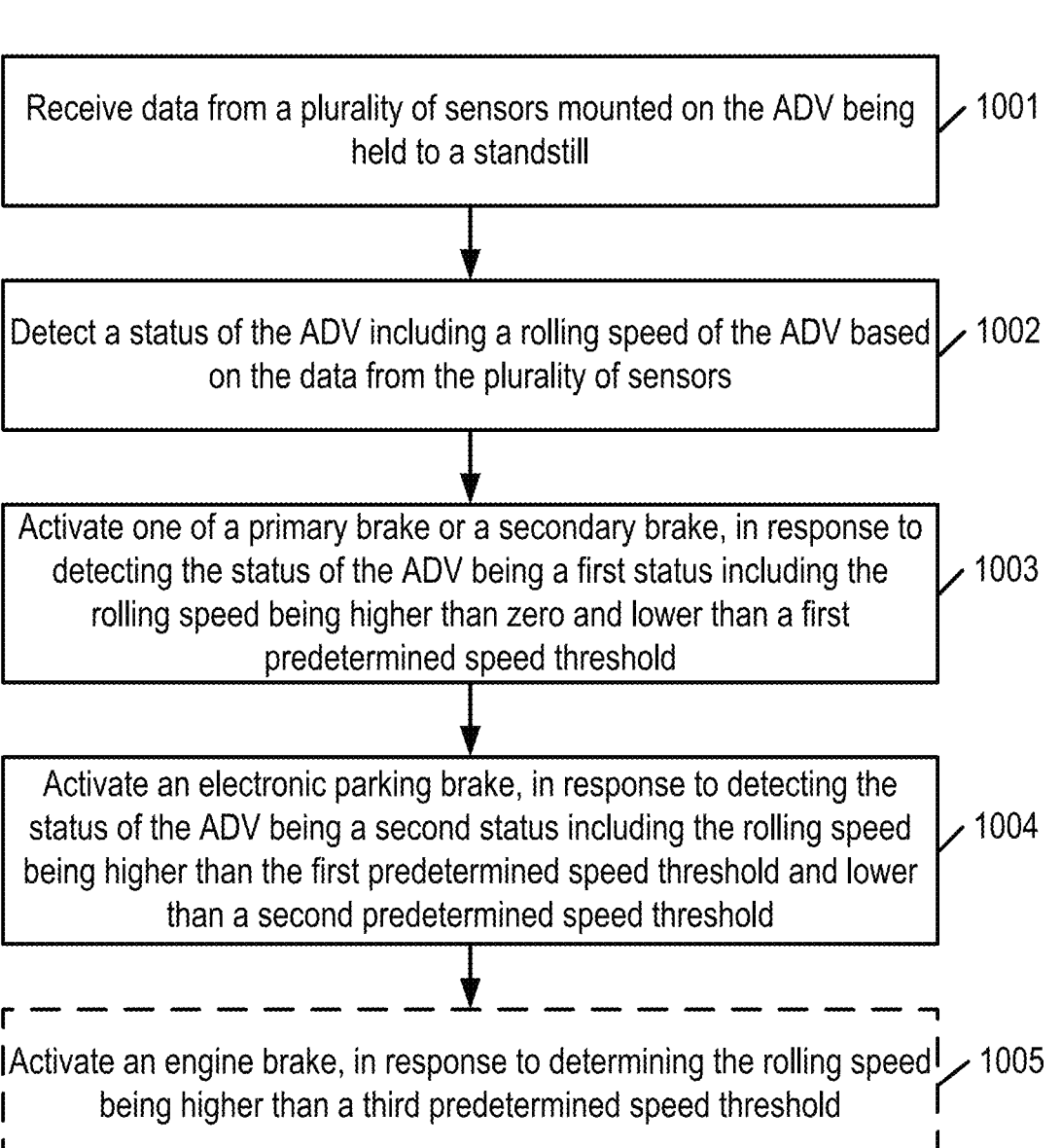

1000

Receive data from a plurality of sensors mounted on the ADV being held to a standstill

1001

Detect a status of the ADV including a rolling speed of the ADV based on the data from the plurality of sensors

1002

Activate one of a primary brake or a secondary brake, in response to detecting the status of the ADV being a first status including the rolling speed being higher than zero and lower than a first predetermined speed threshold

1003

Activate an electronic parking brake, in response to detecting the status of the ADV being a second status including the rolling speed being higher than the first predetermined speed threshold and lower than a second predetermined speed threshold

1004

Activate an engine brake, in response to determining the rolling speed being higher than a third predetermined speed threshold

Partial Side View

Top View

1200

1400

1404
Completely
circular during
wheel rotation

1402
Non-circular
deformation in
stopped state

1700A

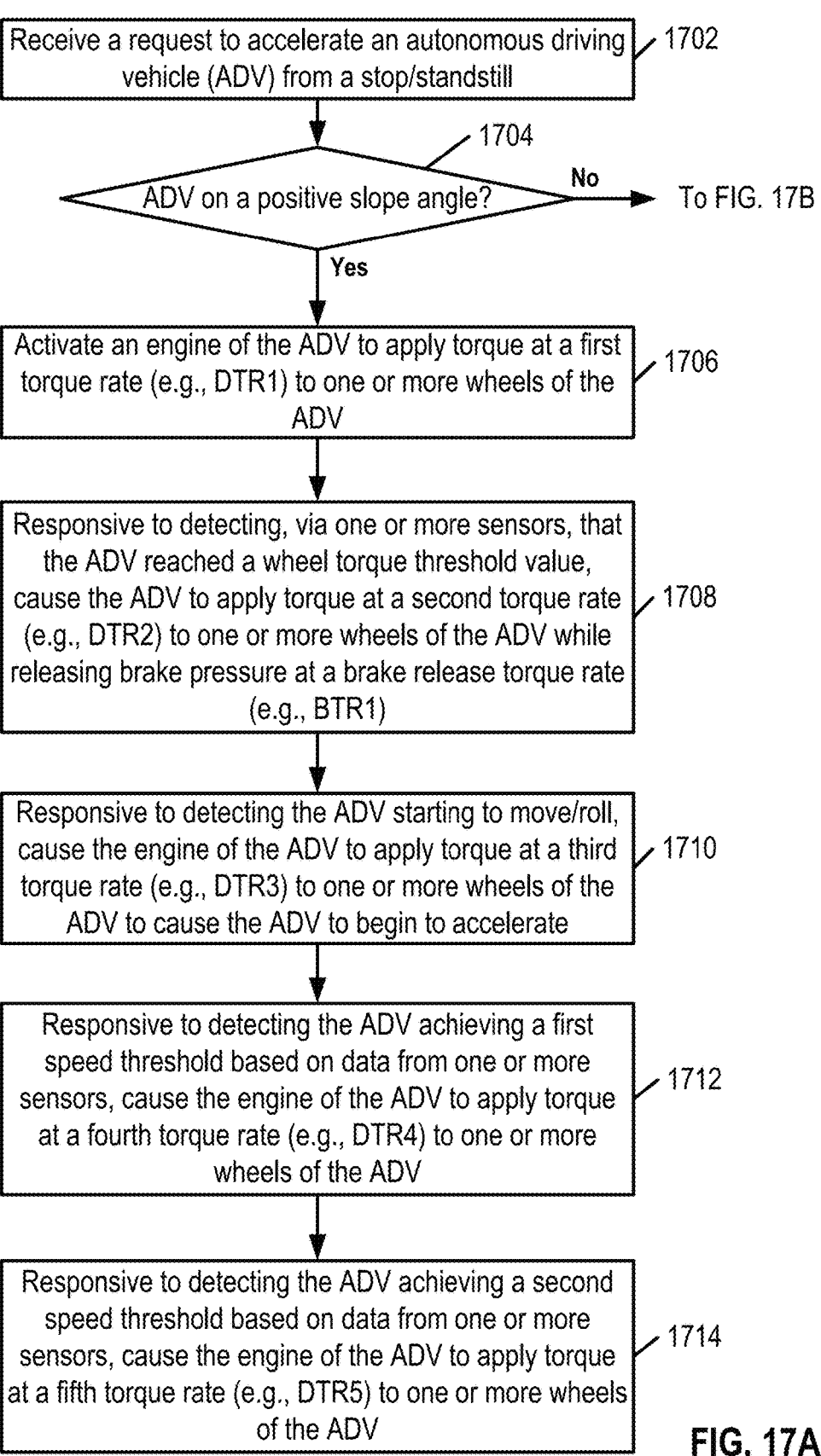

Receive a request to accelerate an autonomous driving vehicle (ADV) from a stop/standstill — 1702

ADV on a positive slope angle? — 1704

No → To FIG. 17B

Yes

Activate an engine of the ADV to apply torque at a first torque rate (e.g., DTR1) to one or more wheels of the ADV — 1706

Responsive to detecting, via one or more sensors, that the ADV reached a wheel torque threshold value, cause the ADV to apply torque at a second torque rate (e.g., DTR2) to one or more wheels of the ADV while releasing brake pressure at a brake release torque rate (e.g., BTR1) — 1708

Responsive to detecting the ADV starting to move/roll, cause the engine of the ADV to apply torque at a third torque rate (e.g., DTR3) to one or more wheels of the ADV to cause the ADV to begin to accelerate — 1710

Responsive to detecting the ADV achieving a first speed threshold based on data from one or more sensors, cause the engine of the ADV to apply torque at a fourth torque rate (e.g., DTR4) to one or more wheels of the ADV — 1712

Responsive to detecting the ADV achieving a second speed threshold based on data from one or more sensors, cause the engine of the ADV to apply torque at a fifth torque rate (e.g., DTR5) to one or more wheels of the ADV — 1714

FIG. 17A

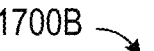
1700B
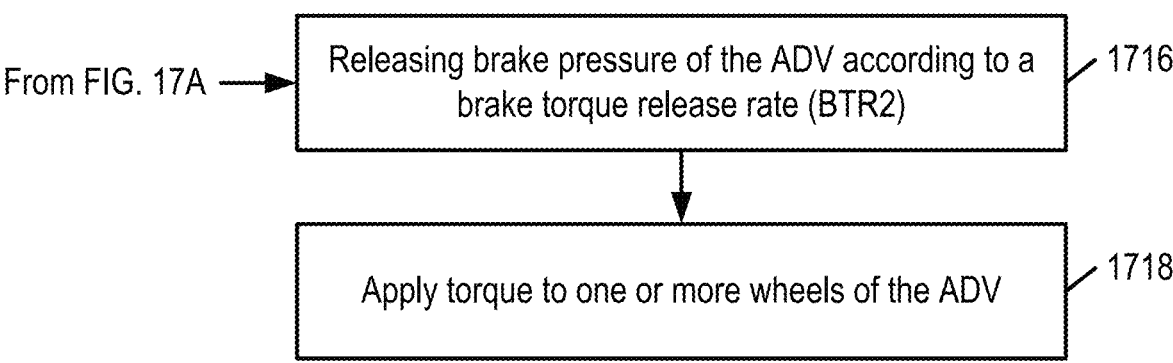
From FIG. 17A → Releasing brake pressure of the ADV according to a brake torque release rate (BTR2)     1716
Apply torque to one or more wheels of the ADV     1718
FIG. 17B

1800

| | Primary Braking Torque (A) 1805 | Secondary Braking OR EPB (B) 1810 | Propulsion torque (C) 1815 | Primary Brake Torque & Propulsion Torque (D) 1820 |
|---|---|---|---|---|
| Occupant experience 1840 | | | | |
| 1841 Safe & Start Rolling In Non-Drive-Off Direction & Very Low Speed Rolling | | | ✓ | |
| 1842 Safe & Rolling In Non-Drive-Off Direction But Low Speed Rolling | | | | ✓ |
| 1843 Safe & Rolling In Non-Drive-Off Direction & Very Low Speed But Rolling Distance Greater Than X mm | | | | ✓ |
| 1844 Safe & Rolling Back & High Speed (Select Option based upon speed threshold(s)) | ✓ | ✓ | | ✓ |
| 1845 Road condition (wet / slippery (i.e. low friction)) | ✓ | | | ✓ |
| Safety related 1850 | | | | |
| 1851 Hit object (e.g., vehicle or person) | ✓ | | | |
| 1852 Operating in an unexpected way (e.g., on a curved road and moving in unexpected way | ✓ | | | |
| 1853 Rolling distance is over a distance threshold | ✓ | ✓ | | |
| 1854 Wheel Slipping | ✓ | | | |
| 1855 Rolling over a speed threshold | ✓ | ✓ | | |

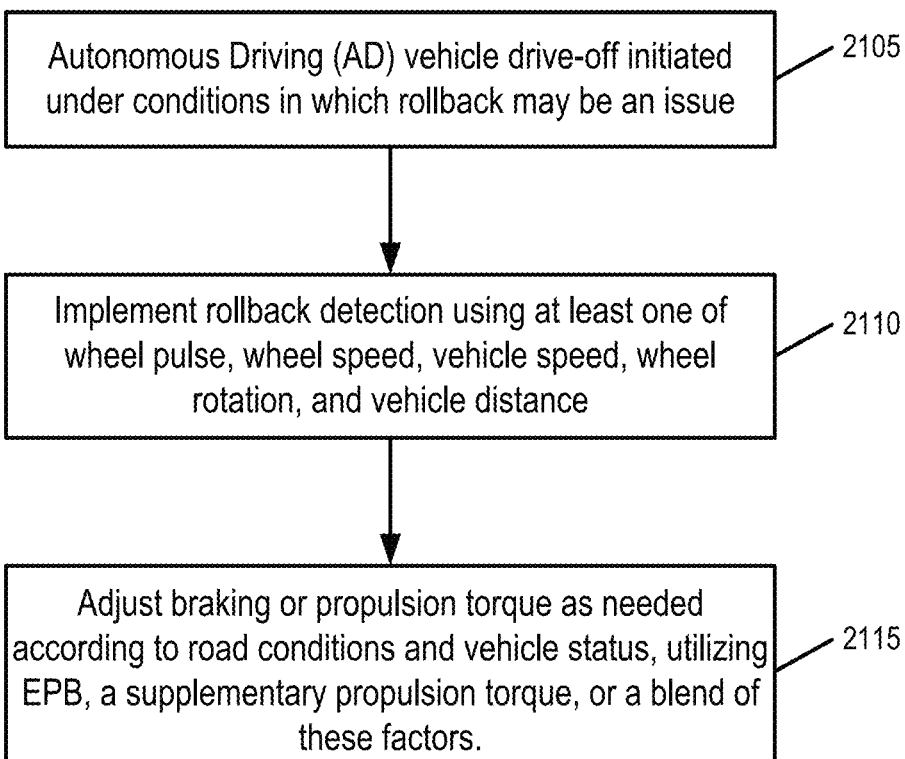

Autonomous Driving (AD) vehicle drive-off initiated under conditions in which rollback may be an issue — 2105

Implement rollback detection using at least one of wheel pulse, wheel speed, vehicle speed, wheel rotation, and vehicle distance — 2110

Adjust braking or propulsion torque as needed according to road conditions and vehicle status, utilizing EPB, a supplementary propulsion torque, or a blend of these factors. — 2115

FIG. 21

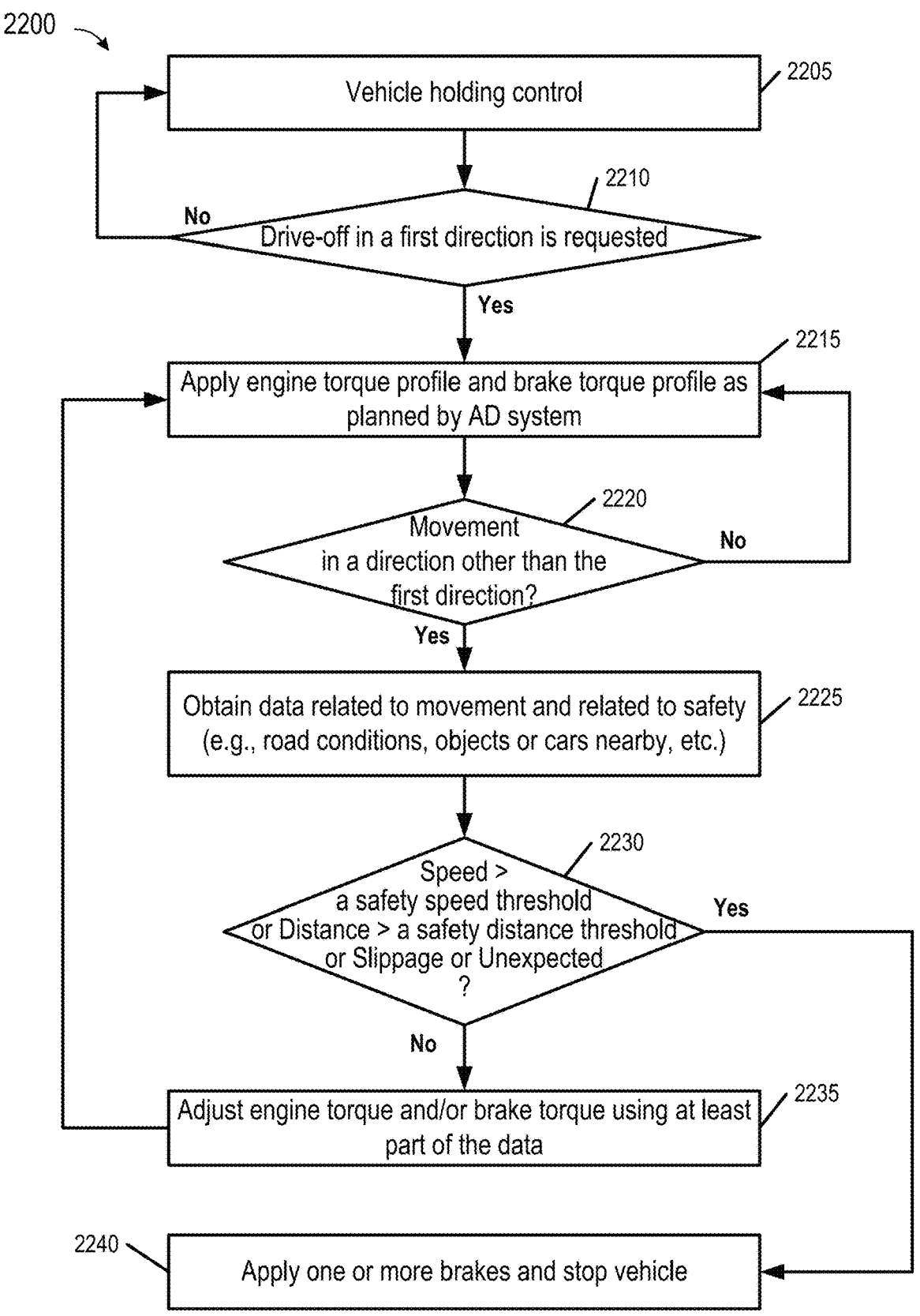

2200

2205 — Vehicle holding control

2210 — Drive-off in a first direction is requested — No / Yes

2215 — Apply engine torque profile and brake torque profile as planned by AD system 2220 — Movement in a direction other than the first direction? — No / Yes 2225 — Obtain data related to movement and related to safety (e.g., road conditions, objects or cars nearby, etc.)

2230 — Speed > a safety speed threshold or Distance > a safety distance threshold or Slippage or Unexpected ? — Yes / No 2235 — Adjust engine torque and/or brake torque using at least part of the data 2240 — Apply one or more brakes and stop vehicle

FIG. 22

VEHICLE CONTROL FOR AUTONOMOUS DRIVING VEHICLE FOR SMOOTH DRIVE-OFF

CROSS-REFERENCE TO RELATED APPLICATION

This patent application is related to and claims priority benefit under 35 USC § 120 as a continuation-in-part to co-pending and commonly-owned U.S. patent application Ser. No. 18/297,594, filed on 7 Apr. 2023, entitled "SYSTEMS AND METHODS FOR DRIVE-OFF FROM A STOPPED POSITION FOR AN AUTONOMOUS DRIVING VEHICLE," and listing Baoping Yuan as inventor, which patent document is incorporated by reference herein in its entirety and for all purposes.

TECHNICAL FIELD

Embodiments of the present disclosure relate generally to operating autonomous driving vehicles. More particularly, embodiments of the disclosure relate to controlling an autonomous driving vehicle (ADV).

It shall be noted that the subject matter discussed in the background section should not be assumed to be prior art merely because of it being mentioned in this background section. Similarly, a problem mentioned in the background section or associated with the subject matter of the background section should not be assumed to have been previously recognized in the prior art. The subject matter in the background section merely represents different approaches, which in and of themselves may also be inventions.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. It is important to control the ADV to avoid accidents. According to the American transaction department, 5% of crash accidents were caused by braking problems. It is difficult to control the braking unit of the ADV to hold the ADV stably, particularly if the ADV is on a gradient. If the ADV starts to roll back or forward, it is challenging to control the ADV to avoid further rolling faster. On the other hand, the occupant's or passenger's experience is also a factor of consideration for controlling the ADV if the ADV starts to roll.

Conventionally, if the ADV starts to roll while in standstill status, the control system of the ADV would add more pressure. However, the conventional method has several problems. For example, the command of adding more pressure may not transfer successfully to the braking system due to computing delays or software errors. The braking torque may not be enough to protect the vehicle from rolling. The braking system's torque may have some issues. The ramp-up rate of brake torque may be too low. Other braking systems may have issues at the same time. Thus, the conventional method cannot hold the ADV effectively. Further, there may be an occupant or passenger comfort issue if the ramp-up rate of brake torque is too high.

In addition to issues related to braking, there are also issues related to accelerating from a stop. Consider, by way of example, an ADV that is stopped at an intersection, particularly an uncontrolled intersection in which there are no electronically controlled right-of-way indicators. In such situations, if the ADV has too slow of an acceleration from the stop position (which may also be referred to herein as "drive off"), another vehicle may proceed before the ADV even if it was properly the ADV's turn to advance through the intersection. In such a scenario, it is not uncommon for the ADV to be stuck at the intersection for a long time as successive drivers perceive the slow drive-off reaction of the ADV as yielding the right-of-way to them.

In addition to potentially being stuck at an uncontrolled intersection, there are additional problems that should be considered for the drive-off process of an ADV.

First, there are safety considerations. For example, if the ADV is stopped on a road that is sloped, release of the braking system should be coordinated so that the ADV does not roll backwards into a vehicle behind it. Transitioning from a stationary state to a driving state should be agile and smooth. Agile drive-off can improve vehicle safety and efficiency. Smoothly accelerating from a stop mimics regular traffic, which avoids confusion and potential accidents at intersections. Also, smooth operations tend to result in more efficient use of resources (battery power or petroleum depending upon the type of engine in the ADV).

Second, agile drive-off not only improves vehicle safety and efficiency, but it is more pleasing for passengers. To ensure occupants have a pleasant and comfortable ride, the ADV should drive off smoothly—with big jerks and without slipping (which can also be a safety issue). Furthermore, a smooth and pleasant ride for occupants should occur at all times and under all circumstances, regardless of the road conditions. For example, the brake torque and wheel torque of the ADV should be controlled adaptively to provide the same smoothness regardless of whether the ADV is accelerating from a stop on an incline (a positive slope) surface, on a decline (a negative slope) surface, or on a flat surface.

Accordingly, what is needed are systems and methods that facilitate a smooth, fast, and safe drive-off for ADV even if the ADV is stopped on an inclined surface with a large slope.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 is a block diagram illustrating a networked system, according to embodiments of the present disclosure.

FIG. 10 is a flow diagram illustrating an example of a process of performing a redundant holding control to prevent rolling of an autonomous driving vehicle, according to embodiments of the present disclosure.

FIGS. 17A & 17B depict another methodology for facilitating a start from a stop position for an autonomous driving vehicle, according to embodiments of the present disclosure.

FIG. 18 depicts a table of different scenarios and different corresponding rules for the application of engine (or propulsion) torque and/or one or more braking systems, according to embodiments of the present disclosure.

FIG. 21 depicts a general control strategy for handling rolling when attempting a drive-off, according to embodiments of the present disclosure.

FIG. 22 depicts a general methodology for handling rolling when attempting a drive-off, according to embodiments of the present disclosure.

DETAILED DESCRIPTION

Figure 1:
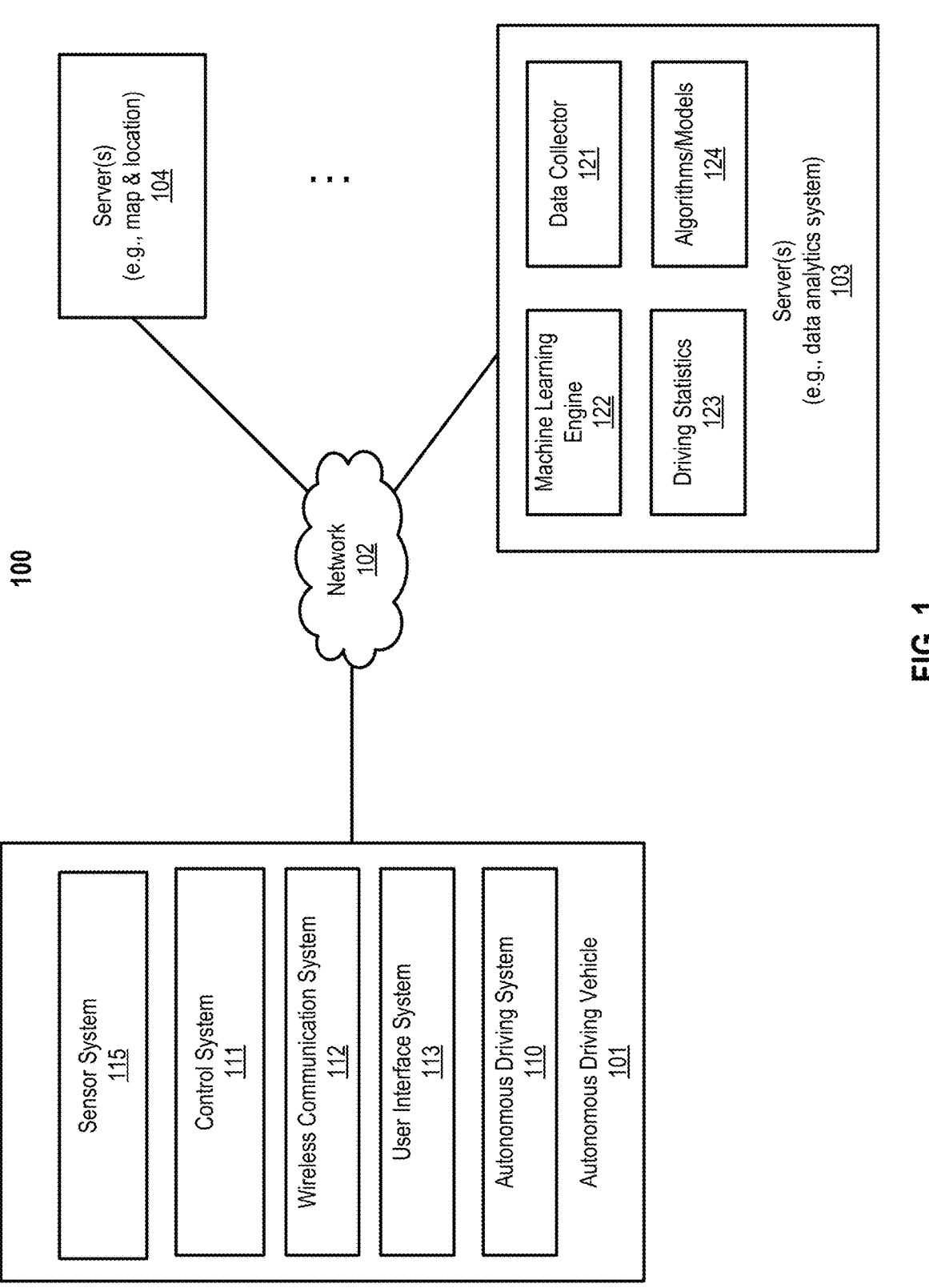

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgment, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," "comprising," or any of their variants shall be understood to be open terms, and any lists of items that follow are example items and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded. A set may contain any number of elements, including the empty set.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of autonomous driving (AD) computing systems, aspects of the present disclosure are not so limited. For example, the embodiments presented herein may be applied to systems that are not fully autonomous. Accordingly, aspects of the present disclosure may be applied or adapted for other uses and in other contexts.

A. ADV Redundant Holding Controls Embodiments

According to some aspects, embodiments of a redundant holding control technique to prevent rolling of an ADV are provided herein. Not only the safety but also the occupant or passenger feeling of the ADV may be considered. In order to balance the safety and the occupant or passenger comfort, different stages may be determined based on the status of the ADV. Different actions may be performed based on the different stages. In this technique, the brake unit of the control system may add the braking torque quickly based on the rolling speed of the ADV. For example, the brake unit may hold the ADV on a slope. When the vehicle slips, the primary brake may be used to add the wheel pressure, and a warning message (e.g., Message-1) may be generated. For example, the primary brake may be used to add the wheel pressure below a first predetermined rate threshold based on the status of the ADV (mass, rolling speed) and road conditions (friction, slop gradient). If the ADV continues to slip over with the rolling speed exceeding the low-speed threshold, the electronic parking brake (EPB) may be activated, and a warning message (e.g., Message-2) may be generated. If the primary brake fails, or the EBP fails, the secondary brake may be activated, and a warning message (e.g., Message-3) may be generated. If the ADV comes to a standstill, parking may be requested to help to hold the ADV. If all the brakes still cannot hold the ADV from rolling, the engine brake may be used to reduce the crash damage, and a warning message (e.g., Message-4) may be generated.

According to some embodiments, data is received from a plurality of sensors mounted on an ADV being held to a standstill. A status of the ADV including a rolling speed of the ADV is detected based on the data from the plurality of sensors. At least one of a primary brake or a secondary brake is activated, in response to detecting the status of the ADV being a first status including the rolling speed being higher than zero and lower than a first predetermined speed threshold. An electronic parking brake is activated, in response to detecting the status of the ADV being a second status including the rolling speed being higher than the first predetermined speed threshold and lower than a second predetermined speed threshold.

In one or more embodiments, the status of the ADV may further include a distance between the ADV and an obstacle.

In one or more embodiments, whether the primary brake is available in response to detecting the rolling speed being higher than zero may be determined. In one or more embodiments, the primary brake may be activated in response to determining that the primary brake is available. In one or more embodiments, the primary brake may be activated including applying a wheel pressure below a predetermined rate threshold.

In one or more embodiments, a secondary brake may be activated, in response to determining the status of the ADV being a third status including the rolling speed being higher than the second predetermined speed threshold and lower than a third predetermined speed threshold. In one or more embodiments, an engine brake may be activated, in response to determining the status of the ADV being a fourth status including the rolling speed being higher than the third predetermined speed threshold.

In one or more embodiments, parking may be activated, in response to determining the rolling speed being zero. In one or more embodiments, the secondary brake may be activated in response to determining that the primary brake is not available. In one or more embodiments, the secondary brake may be activated including applying a wheel pressure below a predetermined rate threshold.

In one or more embodiments, an engine brake may be activated, in response to determining the rolling speed being higher than the second predetermined speed threshold.

In one or more embodiments, a first warning message may be generated with a first level of warning in response to detecting the status of the ADV being the first status. In one or more embodiments, a second warning message may be generated with a second level of warning in response to detecting the status of the ADV being the second status, where the second level of warning is higher than the first level of warning.

In one or more embodiments, a third warning message may be generated with a third level of warning in response to detecting the status of the ADV being a third status including the rolling speed being higher than the second predetermined speed threshold and lower than a third predetermined speed threshold, where the third level of warning is higher than the second level of warning.

In one or more embodiments, a fourth warning message may be generated with a fourth level of warning in response to detecting the status of the ADV being a fourth status including the rolling speed being higher than the third predetermined speed threshold, where the fourth level of warning is higher than the third level of warning.

FIG. 1 is a block diagram illustrating an autonomous driving network configuration according to one embodiment of the disclosure. Referring to FIG. 1, network configuration 100 includes autonomous driving vehicle (ADV) 101 that may be communicatively coupled to one or more servers 103-104 over a network 102. Although there is one ADV shown, multiple ADVs can be coupled to each other and/or coupled to servers 103-104 over network 102. Network 102 may be any type of network, such as a local area network (LAN), a wide area network (WAN) such as the Internet, a cellular network, a satellite network, an edge network, or a combination thereof, and may comprise wired, wireless, or both connectivity. Server(s) 103-104 may be any kind of server or a cluster of servers, such as Web or cloud servers, application servers, backend servers, or a combination thereof. Servers 103-104 may be data analytics servers, content servers, traffic information servers, map and point of interest (MPOI) servers, location servers, etc.

An ADV refers to a vehicle that may be configured to operate in an autonomous mode in which the vehicle navigates through an environment with little or no input from a driver. Such an ADV may include a sensor system having one or more sensors that are configured to detect information about the environment in which the vehicle operates. The vehicle and its associated controller(s) may use the detected information to navigate through the environment. ADV 101 may operate in a manual mode, a fully autonomous mode, or a partially autonomous mode.

In one or more embodiments, ADV 101 includes, but is not limited to, autonomous driving system (ADS) 110, vehicle control system 111, wireless communication system 112, user interface system 113, and sensor system 115. ADV 101 may further include certain common components included in ordinary vehicles, such as an engine, wheels, steering wheel, transmission, etc., which may be controlled by vehicle control system 111 and/or ADS 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, wireless signals, or a combination thereof. For example, components 110-115 may be communicatively coupled to each other via a controller area network (CAN) bus. In one or more embodiments, a CAN bus is a vehicle bus standard designed to allow microcontrollers and devices to communicate with each other in applications without a host computer; it is a message-based protocol, designed originally for multiplex electrical wiring within automobiles but may also be used in many other contexts.

Figure 2:
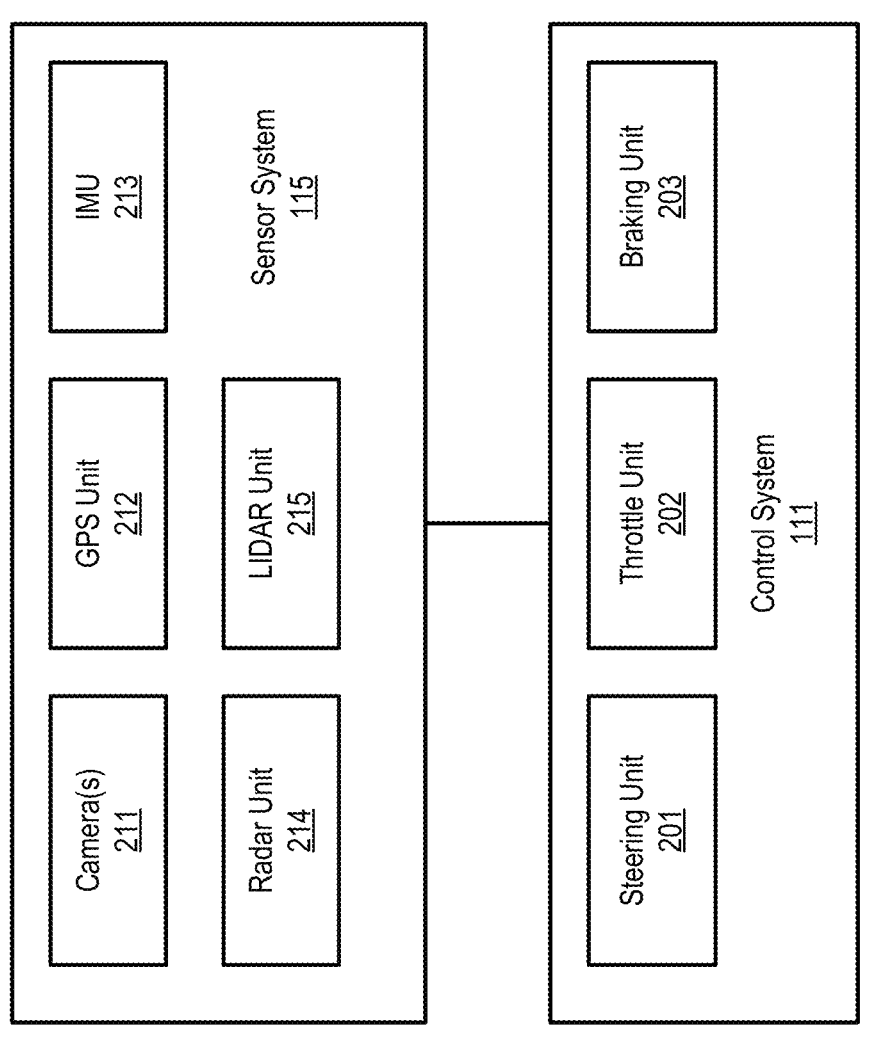
FIG. 2 is a block diagram illustrating an example of an autonomous driving vehicle, according to embodiments of the present disclosure.

Referring now to FIG. 2, in one or more embodiment, sensor system 115 includes, but is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the ADV. IMU unit 213 may sense position and orientation changes of the ADV based on inertial acceleration. Radar unit 214 may represent a system that utilizes radio signals to sense objects within the local environment of the ADV. In one or more embodiments, in addition to sensing objects, radar unit 214 may additionally sense the speed and/or heading of the objects. LIDAR unit 215 may sense objects in the environment in which the ADV is located using lasers. LIDAR unit 215 could include one or more laser sources, a laser scanner, and one or more detectors, among other system components. Cameras 211 may include one or more devices to capture images of the environment surrounding the ADV. Cameras 211 may be still cameras and/or video cameras. A camera may be mechanically movable, for example, by mounting the camera on a rotating and/or tilting a platform.

Sensor system 115 may further include other sensors, such as a sonar sensor, an infrared sensor, a steering sensor, a throttle sensor, a braking sensor, an audio sensor (e.g., a microphone), and a weight or mass sensor. An audio sensor may be configured to capture sound from the environment surrounding the ADV. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor. In one or more embodiments, one or more sensors may be used to determine the mass or weight of the ADV, including its occupants and any other payload. In one or more embodiments, the mass/weight may be determined using one or more factors, such as torque (e.g., wheel torque needed to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, vehicle control system 111 includes, but is not limited to, steering unit 201, throttle unit 202 (also referred to as an acceleration unit), and braking unit 203. Steering unit 201 may be used to adjust the direction or heading of the vehicle. Throttle unit 202 may be used to control the speed of the motor or engine which in turn controls the speed and acceleration of the vehicle. Braking unit 203 may be used to decelerate the vehicle by providing friction to slow the wheels or tires of the vehicle. The details of embodiments of the braking unit 203 will be discussed below. Note that the components as shown in FIG. 2 may be implemented in hardware, software, or a combination thereof.

Referring to FIG. 1, wireless communication system 112 is to allow communication between ADV 101 and external systems, such as devices, sensors, other vehicles, etc. For example, wireless communication system 112 may wirelessly communicate with one or more devices directly or via a communication network, such as servers 103-104 over network 102. Wireless communication system 112 may use any cellular communication network or a wireless local area network (WLAN), e.g., using WiFi to communicate with another component or system. Wireless communication system 112 may communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of ADV 101 may be controlled or managed by ADS 110, especially when operating in an autonomous driving mode. ADS 110 includes the necessary hardware (e.g., processor(s), memory, storage, etc.) and software (e.g., operating system, planning and routing programs, etc.) to receive information from sensor system 115, control system 111, wireless communication system 112, and/or user interface system 113, process the received information, plan a route or path from a starting point to a destination point, and then drive vehicle 101 based on the planning and control information. Alternatively, ADS 110 may be integrated with vehicle control system 111.

For example, a user as a passenger may specify a starting location and a destination of a trip, for example, via a user interface. ADS 110 obtains the trip-related data. For example, ADS 110 may obtain location and route data from an MPOI server, which may be a part of servers 103-104. The location server provides location services and the MPOI server provides map services and the POIs of certain locations. Additionally, or alternatively, such location and MPOI information may be cached locally in a persistent storage device of ADS 110.

While ADV 101 is moving along the route, ADS 110 may also obtain real-time traffic information from a traffic information system or server (TIS). Note that servers 103-104 may be operated by a third-party entity. Additionally, or alternatively, the functionalities of servers 103-104 may be integrated with ADS 110. Based on the real-time traffic information, MPOI information, and location information, as well as real-time local environment data detected or sensed by sensor system 115 (e.g., obstacles, objects, nearby vehicles), ADS 110 can plan an optimal route and drive vehicle 101, for example, via control system 111, according to the planned route to reach the specified destination safely and efficiently.

Server 103 may be a data analytics system to perform data analytics services for a variety of clients. In one or more embodiments, data analytics system 103 includes data collector 121 and machine learning engine 122. Data collector 121 collects driving statistics 123 from a variety of vehicles, either ADVs or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

In one or more embodiments, based on driving statistics 123, machine learning engine 122 generates or trains a set of rules, algorithms, and/or predictive models 124 for a variety of purposes. In one or more embodiments, algorithms 124 may include an algorithm or model to receive data from a plurality of sensors mounted on the ADV being held at a standstill, an algorithm to detect a status of the ADV including a rolling speed of the ADV based on the data from the plurality of sensors, an algorithm to activate (or deactivate) one of a primary brake or a secondary brake, in response to detecting the status of the ADV being a first status including the rolling speed being higher than zero and lower than a first predetermined speed threshold, and/or an algorithm to activate (or deactivate) an electronic parking brake, in response to detecting the status of the ADV being a second status including the rolling speed being higher than the first predetermined speed threshold and lower than a second predetermined speed threshold. Algorithms/models 124 may be uploaded on ADVs to be utilized during autonomous driving in real-time.

Figure 3A:
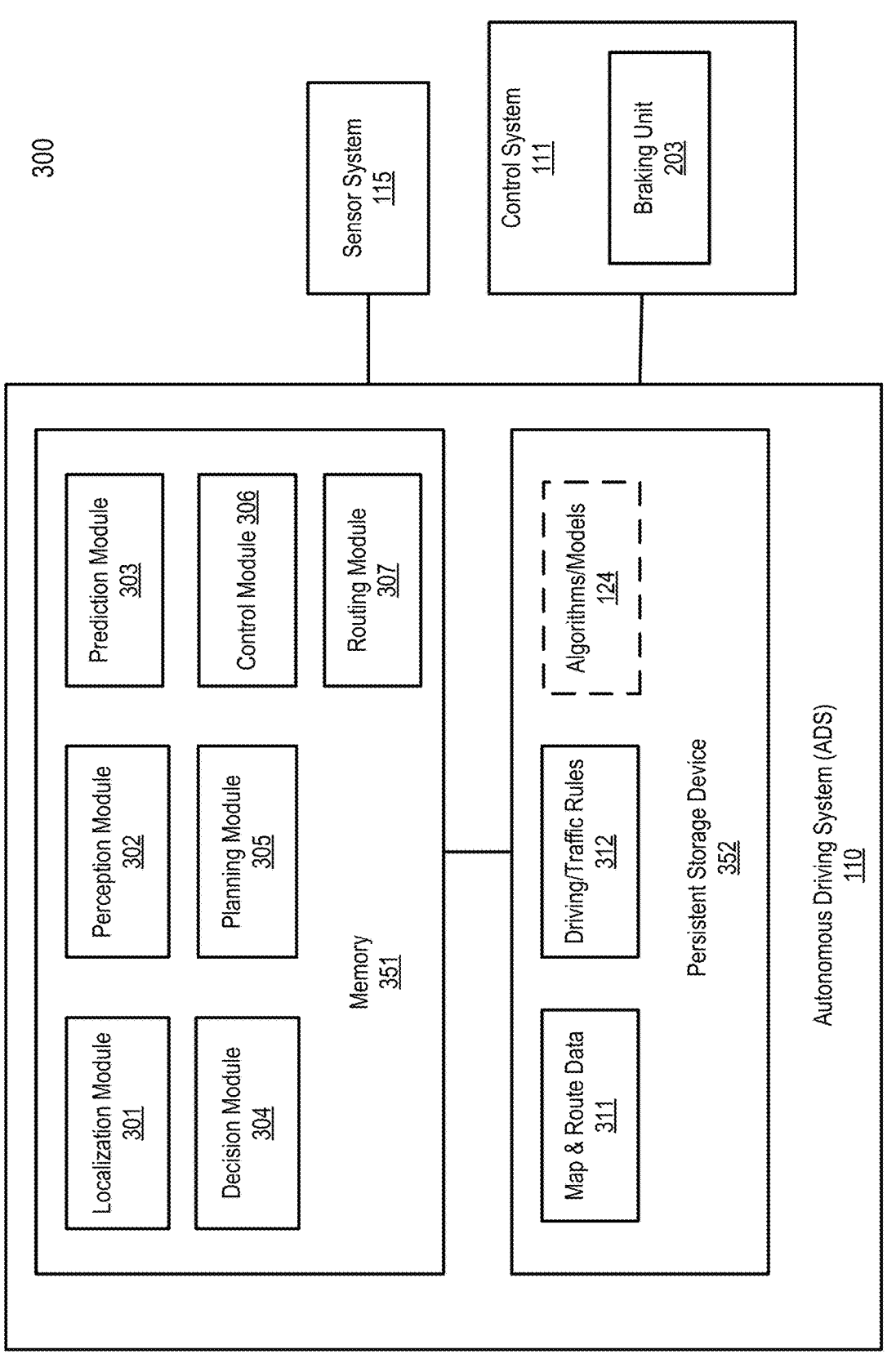
FIGS. 3A & 3B are block diagrams illustrating an example of an autonomous driving system used with an autonomous driving vehicle, according to embodiments of the present disclosure.
Figure 3B:
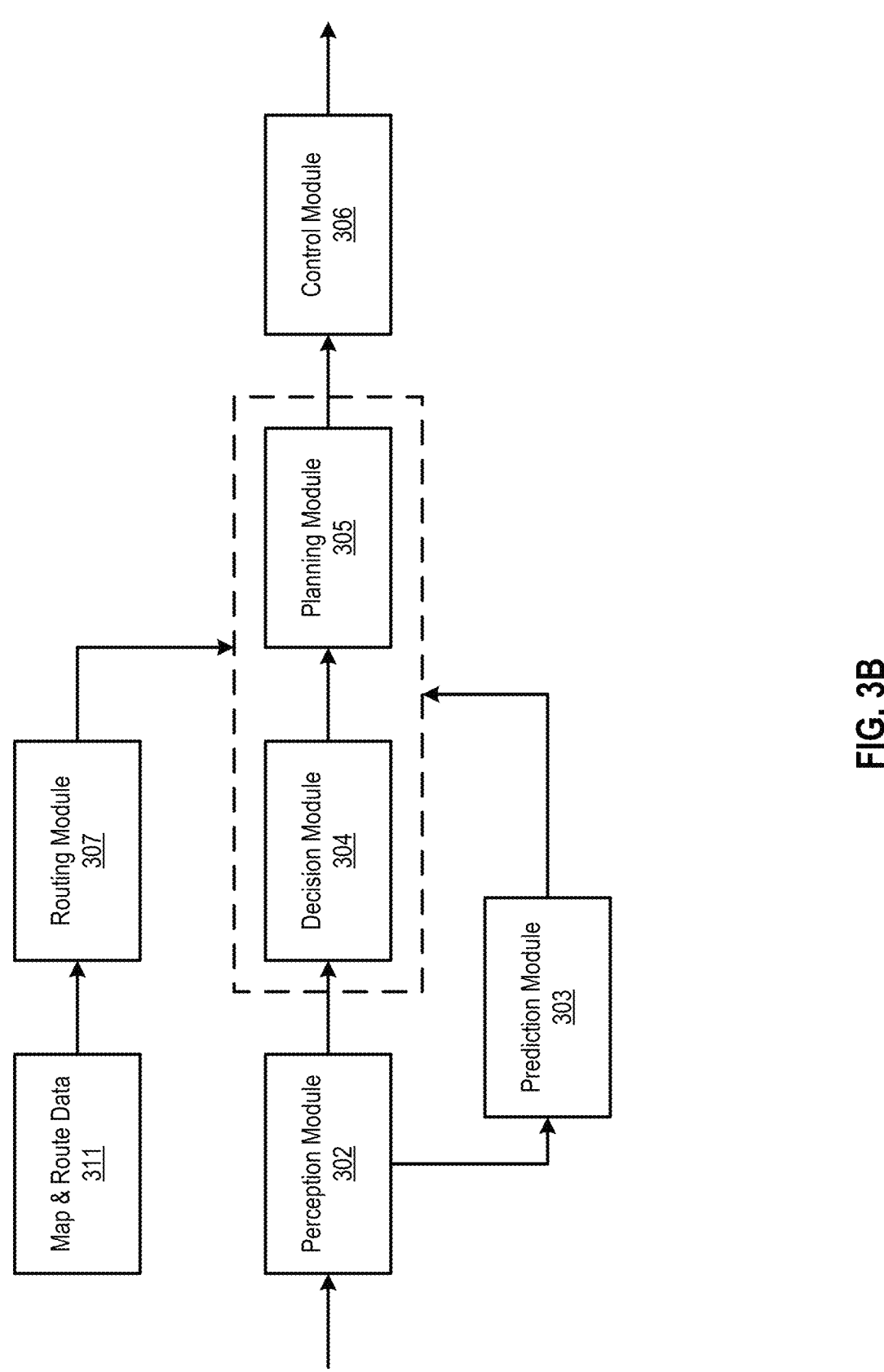

FIGS. 3A and 3B are block diagrams illustrating an example of an autonomous driving system used with an ADV, according to embodiments of the present disclosure. System 300 may be implemented as a part of ADV 101 of FIG. 1 including, but is not limited to, ADS 110, control system 111, and sensor system 115. Referring to FIGS. 3A and 3B, ADS 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module.

Localization module 301 determines a current location of ADV 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of ADV 300, such as map and route data 311, to obtain the trip-related data. For example, localization module 301 may obtain location and route data from a location server and a map and POI (MPOI) server. A location server provides location services and an MPOI server provides map services and the POIs of certain locations, which may be cached as part of map and route data 311. While ADV 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception may include the lane configuration, traffic light signals, a relative position of another vehicle, a pedestrian, a building, a crosswalk, or other traffic-related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of the ADV. The objects may include traffic signals, roadway boundaries, other vehicles, pedestrians, and/or obstacles, etc. The computer vision system may use object recognition methods, video tracking, and other computer vision techniques. In one or more embodiments, the computer vision system maps an environment, tracks objects, and estimates the speed of objects, etc. Perception module 302 may also detect objects based on other sensor data provided by other sensors such as a radar and/or LIDAR.

For each of the objects, prediction module 303 predicts how the object will behave under the circumstances. The prediction may be performed based on the perception data perceiving the driving environment at the point in time in view of a set of map/route information 311 and traffic rules 312. For example, if the object is a vehicle at an opposing direction and the current driving environment includes an intersection, prediction module 303 may predict whether the vehicle is likely to move straight forward or make a turn. If the perception data indicates that the intersection has no traffic light, prediction module 303 may predict that the vehicle may have to fully stop prior to entering the intersection. If the perception data indicates that the vehicle is currently at a left-turn-only lane or a right-turn-only lane, prediction module 303 may predict that the vehicle is more likely to make a left turn or right turn, respectively.

For each of the objects, decision module 304 may make a decision regarding how to handle the object. For example, for a particular object (e.g., another vehicle in a crossing route) as well as its metadata describing the object (e.g., a speed, direction, turning angle, etc.), decision module 304 may decide how to encounter the object (e.g., overtake, yield, stop, pass, etc.). Decision module 304 may make such decisions according to a set of rules, such as traffic rules or driving rules 312, which may be stored in persistent storage device 352.

In one or more embodiments, routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic conditions. That is, if there is no other vehicle, pedestrians, or obstacles on the road, an ADV should exactly or closely follow the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the ADV, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the ADV, by sending proper commands or signals to vehicle control system 111, according to a route or path defined by the planning and control data. In one or more embodiments, the planning and control data include sufficient information to drive the vehicle from a first point to a second point of a route or path using appropriate vehicle settings or driving parameters (e.g., throttle, braking, steering commands, etc.) at different points in time along the path or route.

In one or more embodiments, the planning phase is performed in a number of planning cycles, also referred to as driving cycles, such as, for example, in every time interval of 100 milliseconds (ms). For each of the planning cycles or driving cycles, one or more control commands may be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one or more embodiments, planning module 305 plans a route segment or path segment for the next predetermined period of time such as 5 seconds. For each planning cycle, planning module 305 plans a target position for the current cycle (e.g., the next 5 seconds) based on a target position planned in a previous cycle. Control module 306 may then generate one or more control commands (e.g., throttle, brake, steering control commands, etc.) based on the planning and control data of the current cycle.

Note that decision module 304 and planning module 305 may be integrated as an integrated module. Decision module 304/planning module 305 may include a navigation system or functionalities of a navigation system to determine a driving path for the ADV. For example, the navigation system may determine a series of speeds and directional headings to affect movement of the ADV along a path that substantially avoids perceived obstacles while generally advancing the ADV along a roadway-based path leading to an ultimate destination. The destination may be set according to user inputs via user interface system 113. The navigation system may update the driving path dynamically while the ADV is in operation. The navigation system may incorporate data from a GPS system and one or more maps so as to determine the driving path for the ADV.

Figure 4A:
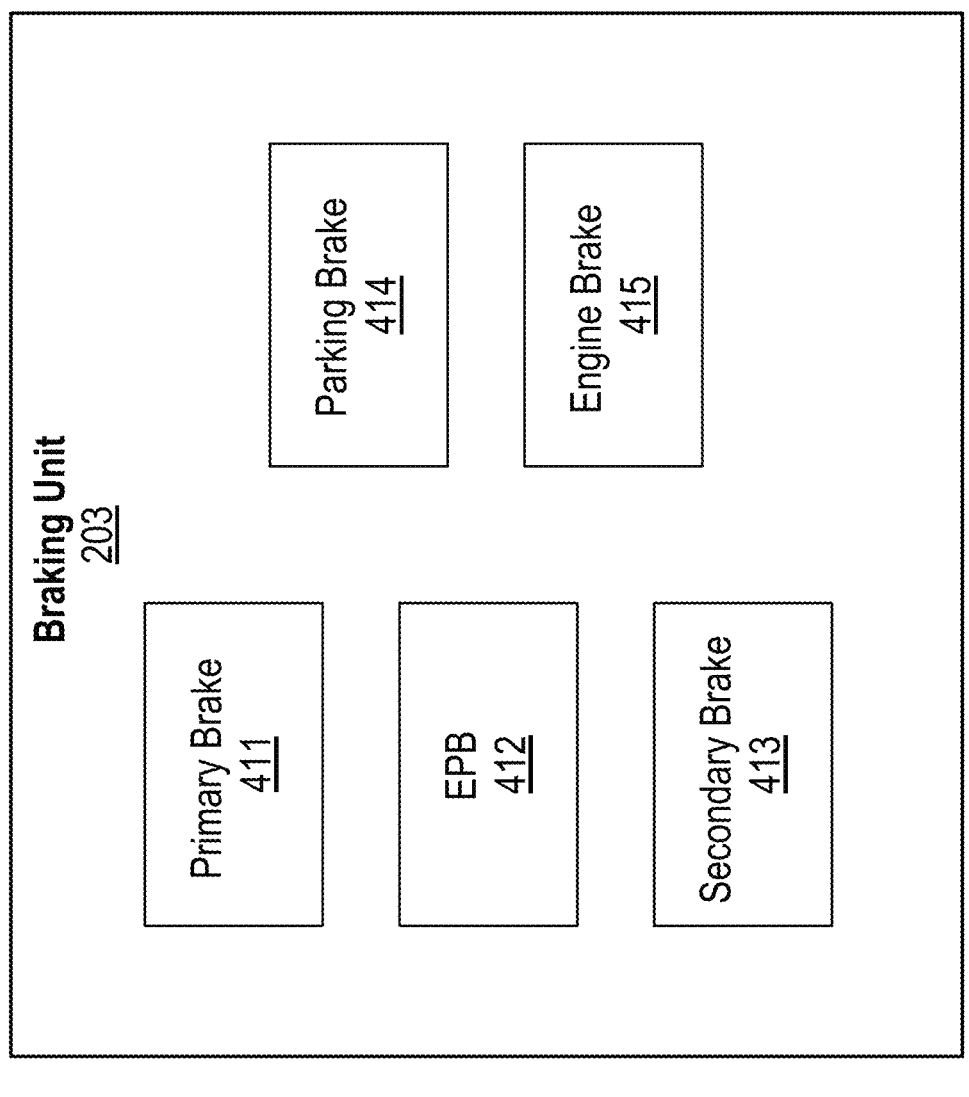
FIGS. 4A & 4B are block diagrams illustrating an example of a braking unit of a control system of an autonomous driving vehicle, according to embodiments of the present disclosure.
Figure 4B:
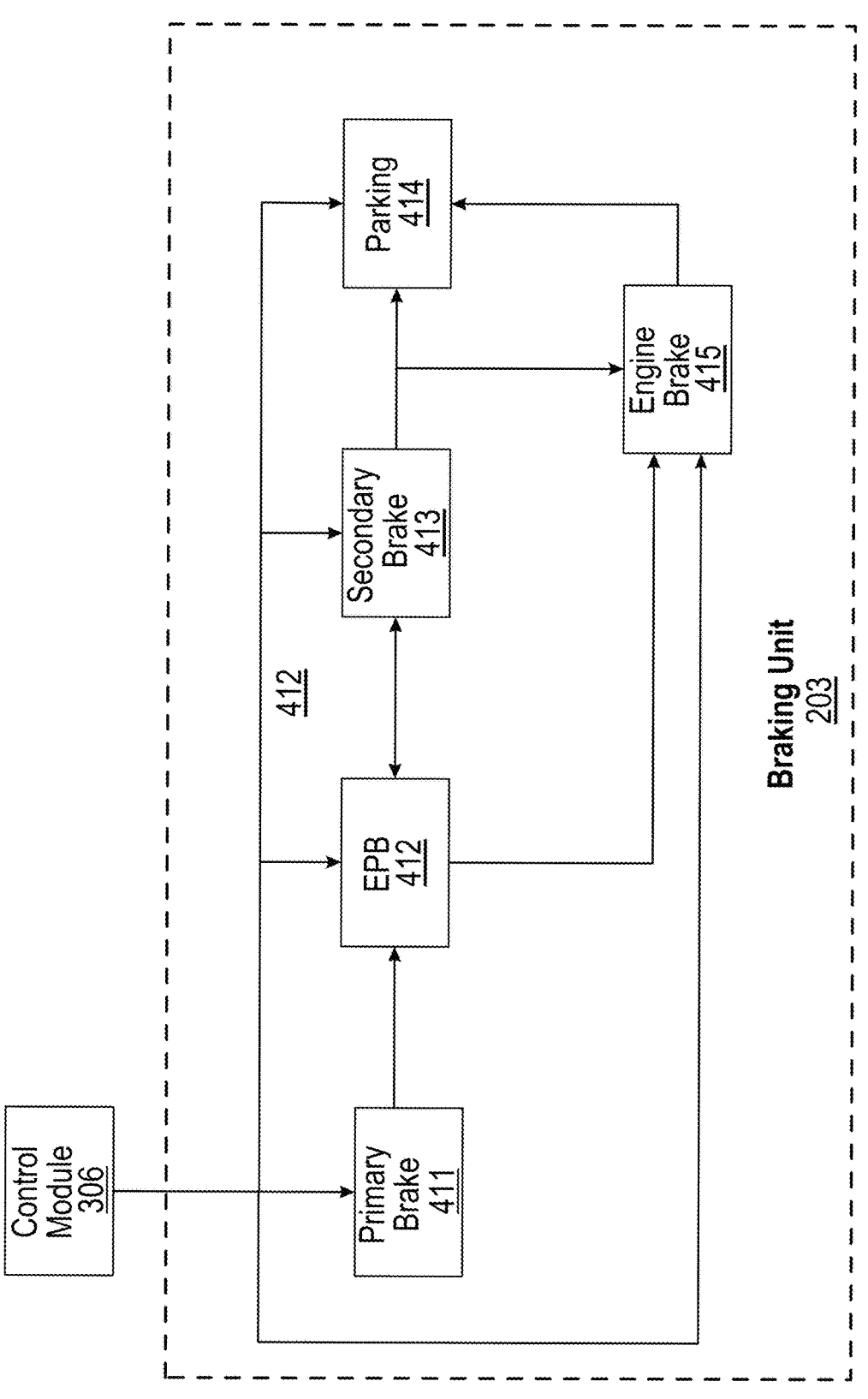

FIGS. 4A and 4B are block diagrams illustrating an example of a braking unit of a control system of an autonomous driving vehicle, according to embodiments of the present disclosure. Referring to FIG. 4A, braking unit 203 includes, but is not limited to, primary brake 411, EPB 412, secondary brake 413, parking 414, and/or engine brake 415. Some or all of brakes 411-415 may be implemented in hardware, software, or a combination thereof. Note that some or all of the brakes 411-415 may be communicatively coupled to or integrated with some or all of the other units of vehicle control system 111 in FIG. 2.

The primary brake 411 may control the speed of the ADV, stop the ADV, or hold the ADV to a standstill (remain stationary). The primary brake 411 may be the rear brakes, which may be used as the first defense to prevent the ADV from rolling. The primary brake 411 may be held safely, however, it has a limitation of timeout. The EPB 412 may be activated with a button (instead of a lever) and the brake pads may be electrically applied to the wheels of the ADV. However, the speed of EPB 412 may be slow. The EPB may also have noise issues. The secondary brake 413 may be for use in the event of failure of the primary brake 411. The secondary brake 413 may be the front brakes, often pressure restricted in order to prevent the front wheels lockup and subsequent loss of steering. The secondary brake 413 may not be able to hold a big pressure for a time period exceeding a threshold, for example, 10 seconds. The secondary brake 413 may have noise issues. The parking brake 414 may keep a parked vehicle stationary, and the parking brake 414 may prevent the ADV from rolling down a hill or moving while at a standstill. However, it may not be safe for the parking brake 414 to hold too much weight. In one or more embodiments, the ADV cannot drive with the parking brake on, which may cause damage to the braking unit. The ADV may need to shift from the status of "parking," in which the parking brake is on, to the status of "drive," in which the parking brake is off, in order to drive. However, the shifting mechanism may be complex. In one or more embodiments, the engine brake 415 may be used to reduce the speed of the ADV. The engine brake 415 may be used as a last defense when all other brakes have failed.

Referring to FIG. 4B, the braking unit may be configured to perform a redundant holding control to balance the safety and the occupant or passenger comfort of the ADV. For example, the brake unit may be configured to hold the ADV on a slope. Different actions may be performed based on the vehicle status of the ADV. The control module 306 controls and drives the ADV, by sending proper commands or signals to vehicle control system 111 including the braking unit 203. The control module 306 and the brake unit 203 may perform the redundant holding control.

In one or more embodiments, when the ADV slips, the primary brake 411 may be used to add the wheel pressure, and a warning message (e.g., Message-1) may be generated. For example, the primary brake 411 may be used to add the wheel pressure below a first predetermined rate threshold based on the status of the ADV being in a first status and/or road conditions. For example, the status of the ADV may include a rolling speed of the ADV. The status of the ADV may include a distance between the ADV and an obstacle, for example, which may be the closest obstacle behind when the ADV is rolling back or the closest obstacle ahead of the ADV when the ADV is rolling forward. The status of the ADV may include a mass of the ADV, for example. The road condition may include the friction of the road, the slope gradient of the road, etc.

In one or more embodiments, the first status may include the rolling speed of the ADV being higher than zero and lower than a first predetermined speed threshold. For example, the first predetermined speed threshold V1 may be 0.1, 0.2, 0.5, or 1 kilometer per hour (kph) or other value. In one or more embodiments, the first status may include the distance between the ADV and the obstacle being larger than a first predetermined distance threshold. In one or more embodiments, the first status may include the mass of the ADV being less than a first predetermined mass threshold. In one or more embodiments, the first status may include the rolling speed of the ADV being higher than zero and lower than a first predetermined speed threshold, the distance between the ADV and the obstacle larger than the first predetermined distance threshold, and/or the mass of the ADV being less than the first predetermined mass threshold. The primary brake 411 may be used to add the wheel pressure slowly below a first predetermined rate threshold to consider the comfort and feeling of the occupant.

If the ADV continues to slip over with the status of the ADV being a second status, the EPB 412 may be activated, and a warning message (e.g., Message-2) may be generated. In one or more embodiments, the second status may include the rolling speed of the ADV being higher than the first predetermined speed threshold and lower than a second predetermined speed threshold, the distance between the ADV and the obstacle less than the first predetermined distance threshold and larger than a second predetermined distance threshold.

If the primary brake 411 fails or the EBP 412 fails, the secondary brake 413 may be activated with the status of the ADV being a third status, and a warning message (e.g., Message-3) may be generated. In one or more embodiments, the third status may include the rolling speed of the ADV being higher than the second predetermined speed threshold and lower than a third predetermined speed threshold, the distance between the ADV and the obstacle less than the second predetermined distance threshold and larger than a third predetermined distance threshold.

If the ADV comes to a standstill, parking 414 may be requested to help hold the ADV. If all the brakes still cannot hold the ADV from rolling and the ADV is in a fourth status, the engine brake 415 may be used to reduce the crash damage, and a warning message (e.g., Message-4) may be generated. In one or more embodiments, the fourth status may include the rolling speed of the ADV being higher than the third predetermined speed threshold, the distance between the ADV and the obstacle less than the third predetermined distance threshold.

In another embodiment, the primary brake 411 may not be available. For example, the primary brake 411 may have problems. The secondary brake 413 may be activated, for example, the secondary brake 413 may be used to add the wheel pressure below a second predetermined rate threshold based on the status of the ADV and road conditions. If the ADV continues to slip over, the EPB 412 may be activated, for example when the rolling speed of the ADV exceeds the first predetermined speed threshold. If all the brakes still cannot hold the ADV from rolling, the engine brake 415 may be used to reduce the crash damage.

Figure 5:
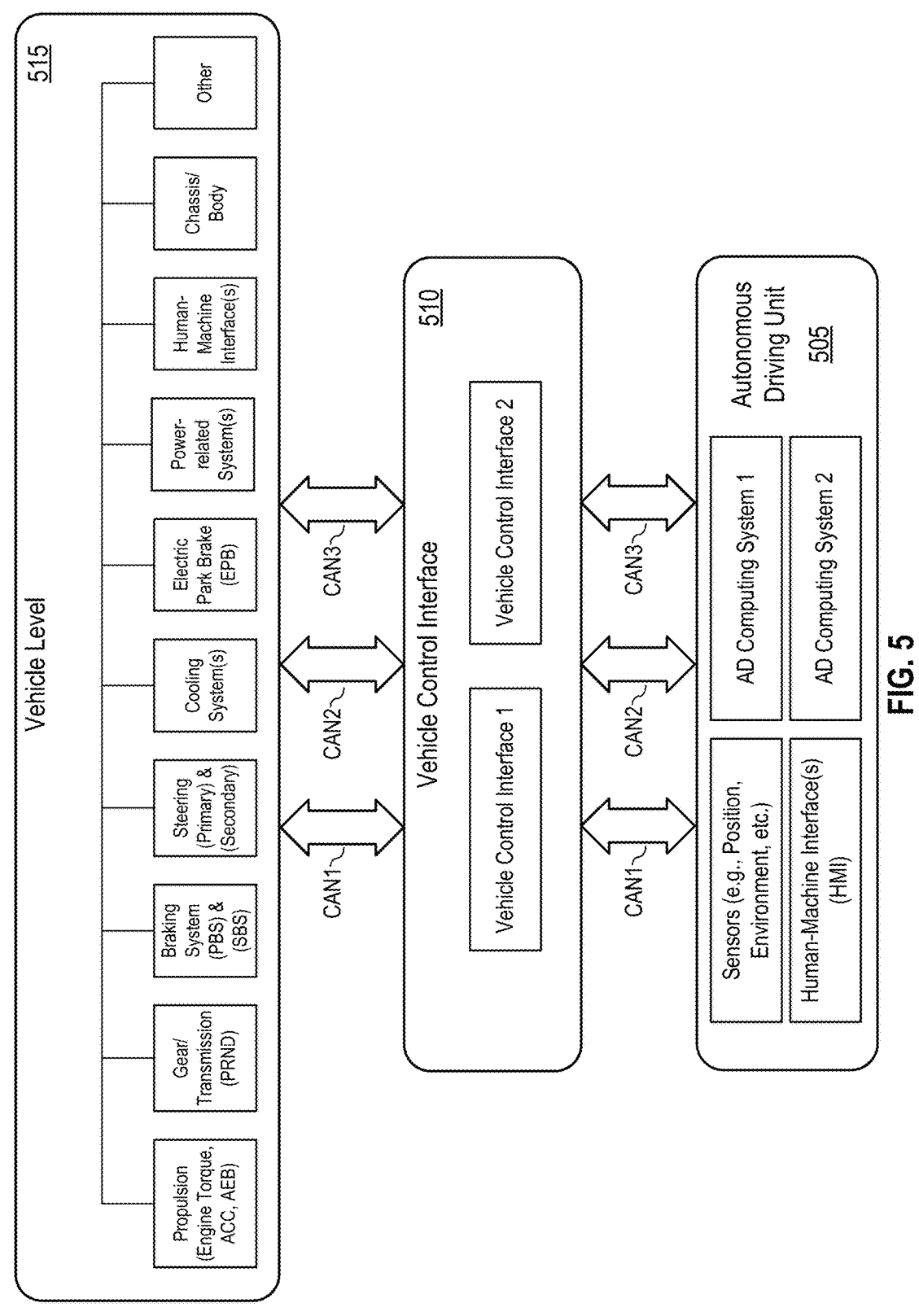
FIG. 5 is a block diagram of an example control system, in accordance with aspects of the present disclosure.

FIG. 5 is a block diagram 500 of an example control system, in accordance with aspects of the present disclosure. As shown, the example control system may include three high-level components: the autonomous driving unit 505, the vehicle control interface 510, and the vehicle level components 515.

The autonomous driving unit 505 may include various sensors (e.g., cameras, microphones, LIDAR, GPS, accelerometers, door sensors, light sensors, proximity sensors, thermal sensors, tilt sensors, hydraulic pressure sensors, brake caliper sensors, power-related sensors, etc.). The autonomous driving unit may include one or more autonomous driving computer systems for computing control inputs to the vehicle-level components (e.g., engine, braking system, steering, etc.).

The vehicle control interface 510 allows the sensor information to be provided to the various vehicle-level components 515. For example, a command/output from the AD computer system may be used to actuate two or more components (e.g., steering, brake, cooling, etc.) at the vehicle level. According to aspects of the present disclosure, power control may be implemented using sensors, the power-related system(s), and one or more computing systems.

In one or more embodiments, the vehicle-level elements may include propulsion-related components (or elements), gear/transmission-related components, steering, braking, interfacing, chassis/body, cooling system(s), and other elements (e.g., tire pressure sensors and controls). While these vehicle-level components are depicted as being connected or communicatively connected via a single connection, there may be one or more redundant connections; there may also be differently configured connections (i.e., certain components may be on different connection segments than other components). The vehicle-level components may include various sensors for providing feedback to the respective operations.

In one or more embodiments, the vehicle-level system may include cooling systems for maintaining one or more components (e.g., engine, computing system, etc.) within an operational temperature range for the respective component. Different cooling systems may be used for different components. For example, if the vehicle includes an engine that requires cooling, the cooling system for the engine may be separate from a cooling system for the computing system. In one or more embodiments, one or more elements of the cooling system may be used in common between cooling systems.

Figure 6:
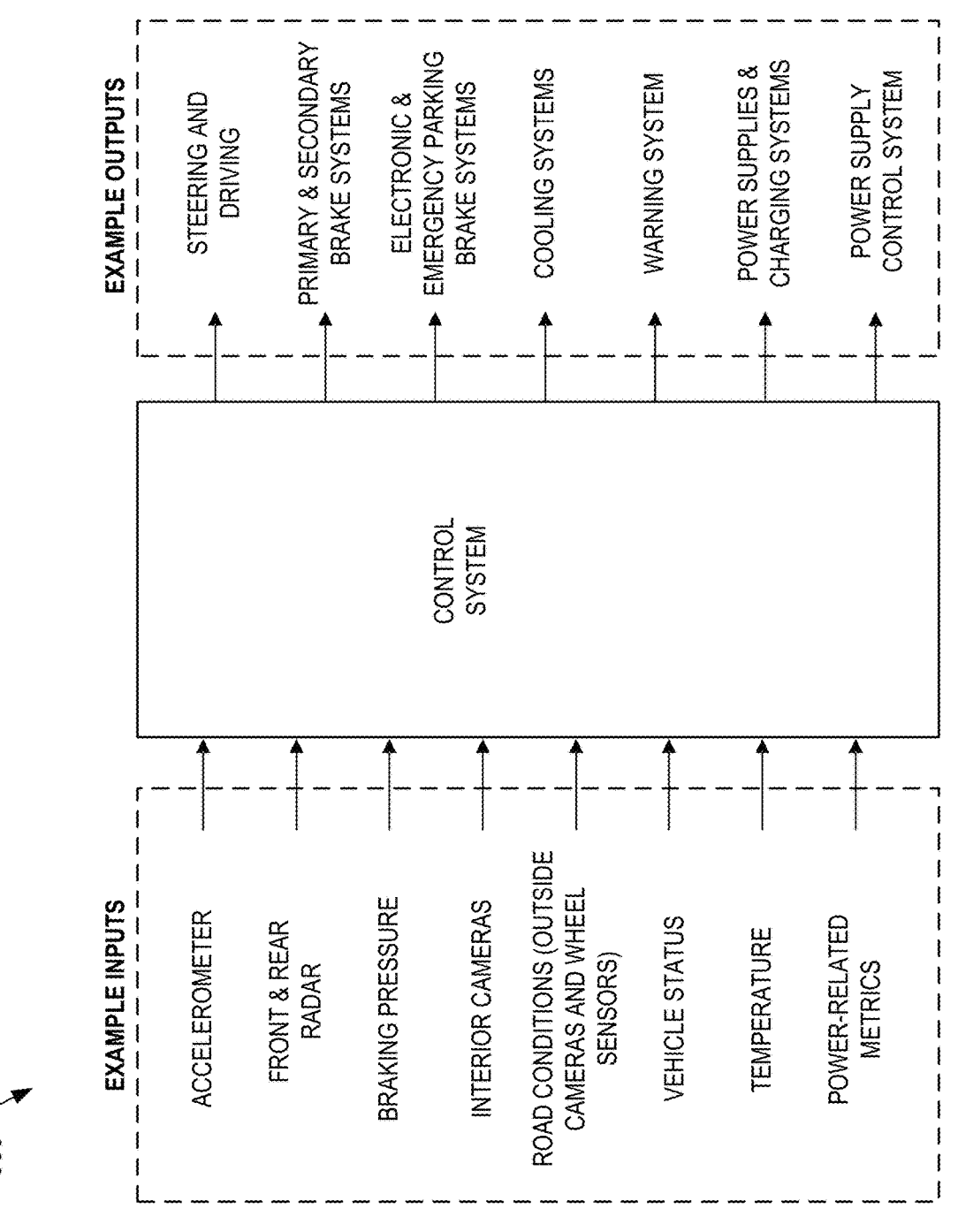
FIG. 6 depicts a diagram of an example control system and associated inputs and outputs, according to embodiments of the present disclosure.

FIG. 6 depicts a diagram 600 of an example control system and associated inputs and outputs, according to embodiments of the present disclosure. As shown, the control system may use various measurements or sensor feedback as input. The example inputs may include information (e.g., speed) from one or more accelerometers, braking pressure valves, hydraulic pressure, brake caliber valves, radar (or LIDAR) information of the front and rear of the ADV, imaging information from interior cameras, road conditions captured by exterior cameras and/or wheel sensors, door sensors, vehicle status (e.g., speed, operation conditions of various systems, such as whether one or more of the braking systems are operating properly, etc.), temperature, and pressure of coolant system, and power-related metrics. While not depicted, in one or more embodiments, the control system may receive one or more failure messages related to conditions of a critical component, such as the power systems and computing systems.

Upon determining a status based upon one or more sensor inputs or messages, the control system may provide various outputs to various systems of the ADV. For example, outputs may include control signals to control power source(s) to one or more computing systems, vehicle control, and alerts and warning systems, among others, for handling power control for the ADV, as disclosed in the current patent document.

In one or more embodiments, one or more wheel sensors may be used to detect the speed of the ADV. The wheel sensors may generate magnetic pulses in the form of waves, proportional to the speed of the ADV. For example, one or more of the ADV's wheel sensors, which may be located at each of the wheels (i.e., front left (FL), front right (FR), rear left (RL), rear right (RR) wheel), may be used to detect the speed of the ADV based on pulses detected. In one or more embodiments, when at least two diagonal wheel sensors (e.g., FL & RR or FR & RL) detect pulses within a set time period, the control system may register a status or state of the ADV. The ADV may be in different states based on the speed of the ADV, and different control techniques may be applied accordingly.

Different actions may be activated or triggered based on different states of the ADV. It shall also be noted that one or more different conditions may be monitored and/or may be combined to form a detected state.

In one or more embodiments, the control system may receive information related to one or more braking systems and initial drive-off and may take action to control the vehicle and for executing one or more actions.

Note that some or all components as shown and described above may be implemented in software, hardware, or a combination thereof. For example, such components can be implemented as software installed and stored in a persistent storage device, which can be loaded and executed in memory by a processor (not shown) to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the detailed descriptions presented herein are presented in terms of methods and symbolic representations of operations on data bits within a computer memory. These descriptions and representations are the ways used by those skilled in the data processing arts to most effectively convey the substance of their work to others skilled in the art. A method may, generally, be conceived to be a self-consistent sequence of operations leading to a desired result or results; the operations may be considered to be those requiring physical manipulations of physical quantities.

It should be borne in mind, however, that these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 7:
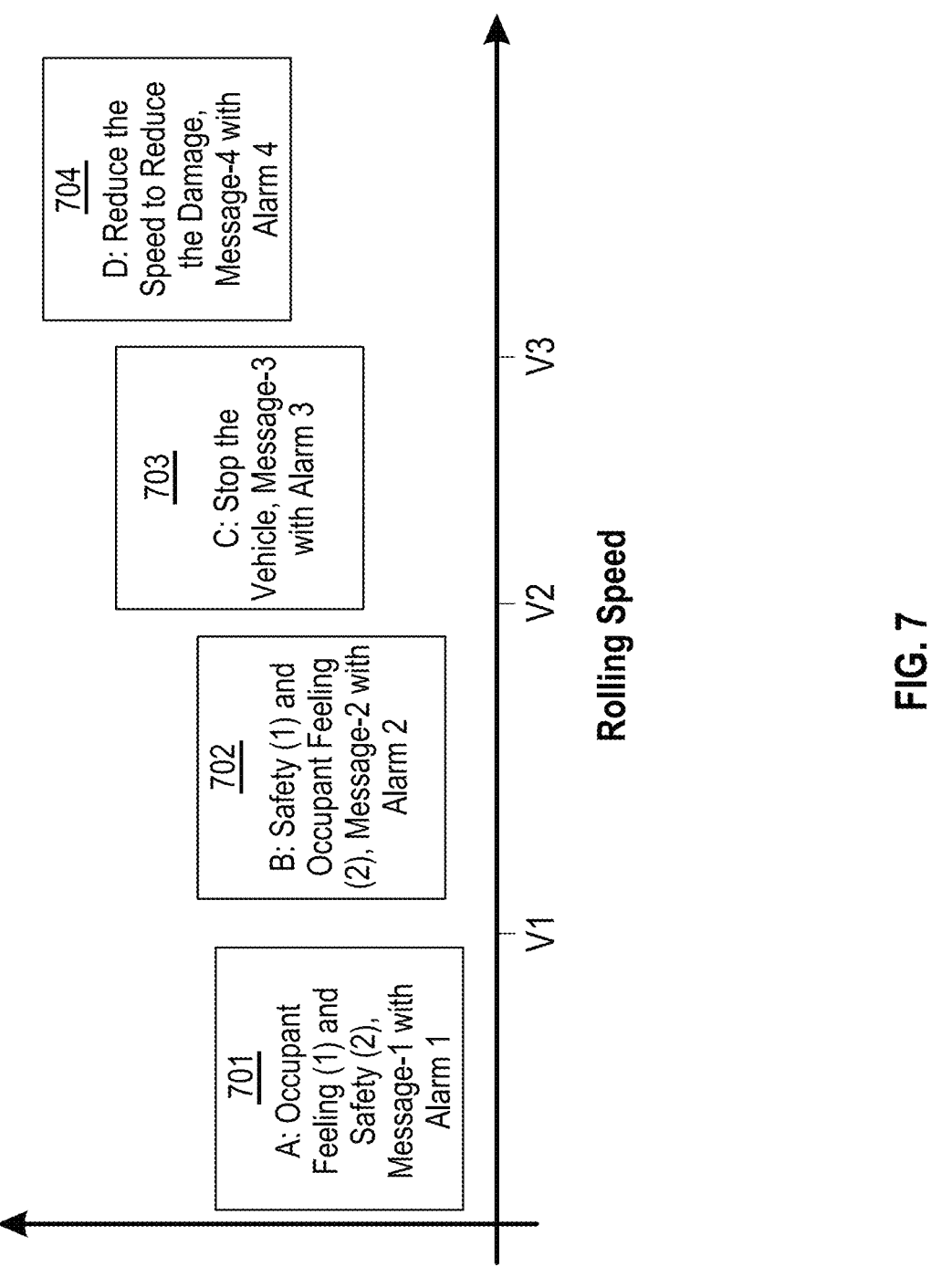
FIG. 7 is a diagram illustrating an example of a redundant holding control based on a status of an autonomous driving vehicle, according to embodiments of the present disclosure.

FIG. 7 is a diagram illustrating an example of a redundant holding control based on a status of an autonomous driving vehicle, according to embodiments of the present disclosure. By using the redundant holding control, not only the safety but also the comfort of the occupant or passenger of the ADV may be considered. In order to balance the safety and the occupant or passenger comfort, different stages of the redundant holding control may be determined based on the status of the ADV. Different actions may be performed based on the different stages.

Referring to FIG. 7, for example, the status of the ADV may be determined based on the rolling speed of the ADV. When initially detecting that the ADV is rolling, e.g., with the rolling speed higher than zero and lower than the first predetermined speed threshold V1, the status of the ADV may be determined to be in the first status. The redundant holding control may be in a first stage 701 based on the first status of the ADV. In the first stage 701, the occupant experience/feeling may be considered first, and the safety may be considered second. The primary brake may be used to add the wheel pressure slowly, below the first predetermined rate threshold, and the warning message (e.g., Message-1) may be generated with a first level of warning. For example, the first level of warning may be slow flashing lights.

If the ADV continues to slip over with the rolling speed exceeding the first predetermined speed threshold V1 but lower than the second predetermined speed threshold V2, the status of the ADV may be determined to be in the second status. The redundant holding control may be in a second stage 702 based on the second status of the ADV. In the second stage 702, the safety may be considered first, and the occupant feeling may be considered second. The EPB may be activated, and a warning message (e.g., Message-2) may be generated with a second level of warning. For example, the second level of warning may be rapid flashing lights. The second level of warning may be higher than the first level of warning.

If the primary brake fails, or the EBP fails, the ADV continues to slip over with the rolling speed exceeding the second predetermined threshold V2 but lower than a third predetermined threshold V3, the status of the ADV may be determined to be in the third status. The redundant holding control may be in a third stage 703 based on the third status of the ADV. In the third stage 703, it is important to stop the ADV, and safety is considered. Thus, the secondary brake may be activated, and a warning message (e.g., Message-3) may be generated with a third level of warning. For example, the third level of warning may be sounds and fast flashing lights. The third level of warning may be higher than the second level of warning.

If the ADV comes to a standstill, parking may be requested to help to hold the ADV. If all the brakes still cannot hold the ADV from rolling, the ADV continues to roll back with the rolling speed exceeding the third predetermined threshold V3, and the status of the ADV may be determined to be in the fourth status. The redundant holding control may be in a fourth stage 704 based on the fourth status of the ADV. In the fourth stage 704, it is important to reduce the speed of the ADV to reduce the crash damage since the ADV may be about to crash into an obstacle. Thus, the engine brake may be activated to reduce the crash damage, and a warning message (e.g., Message-4) may be generated with a fourth level of warning. For example, the fourth level of warning may be a loud alarm sound and rapidly flashing lights. The fourth level of warning may be higher than the third level of warning.

Figure 8A:
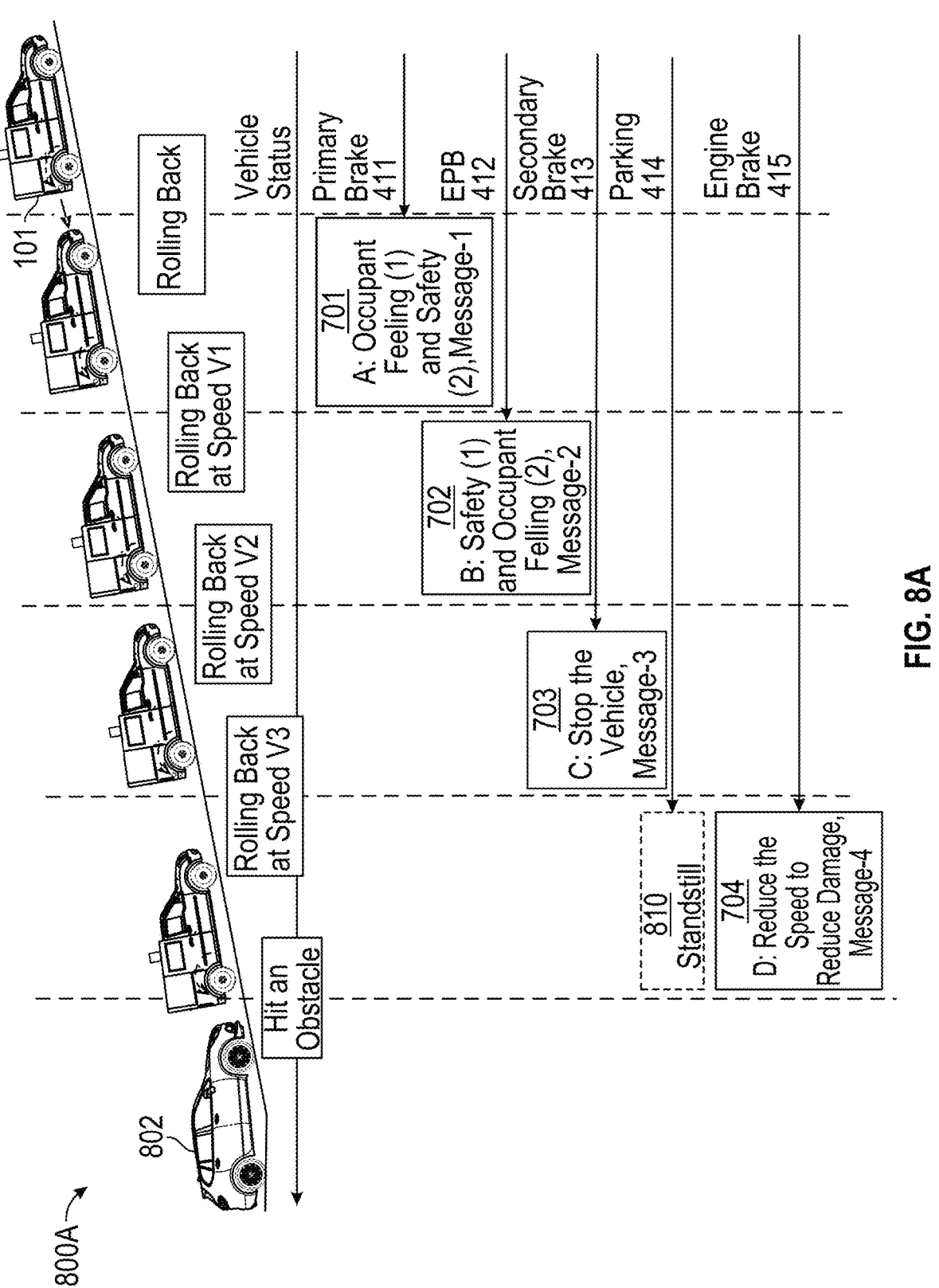
FIG. 8A is a diagram illustrating an example of a redundant holding control to prevent rolling of an autonomous driving vehicle, according to embodiments of the present disclosure.

FIG. 8A is a diagram 800A illustrating an example of a redundant holding control to prevent rolling of the autonomous driving vehicle 101, according to embodiments of the present disclosure. In the redundant holding control, not only the safety but also the comfort of the occupant or passenger of the ADV may be considered. In order to balance the safety and the occupant or passenger comfort, different holding control actions by different brakes may be performed at different stages based on the status of the ADV 101.

Referring to FIG. 8A, ADV 101 may be supposed to be held to a standstill. Initially, the sensors of the ADV 101 may detect that the ADV 101 is rolling back in the first status, e.g., with the rolling speed higher than zero and lower than the first predetermined speed threshold V1, and/or an obstacle 802 is at a distance larger than the first predetermined distance threshold. For example, the first predetermined speed threshold V1 may be 0.1, 0.2, 0.5, or 1 kilometers per hour (kph) or other value. The predetermined distance threshold may be 5, 10, 15, 20 meters, or other value. Based on the first status of ADV 101, the redundant holding control may be in the first stage 701, in which the occupant feeling may be considered first, and the safety may be considered second. The primary brake 411 may be used to add the wheel pressure slowly, for example, below a first predetermined rate threshold R1 (Newton×meters per second (Nm/s), MegaPascals per second (MPa/s), etc.). The control system of the ADV may generate a first warning message (e.g., Message-1), for example, with slow flashing lights.

If the ADV 101 continues to roll back with the rolling speed exceeding the first predetermined speed threshold V1 but lower than the second predetermined speed threshold V2, the status of the ADV may be changed to be in the second status. Based on the second status of the ADV 101, the redundant holding control may be in the second stage 702, in which safety may have priority over the occupant feeling. For example, the second predetermined speed threshold may be 1, 1.5, 2 kph, or other value. The EPB 412 may be activated to try to hold the ADV 101. The control system of the ADV may generate a second warning message (e.g., Message-2), for example, with fast flashing lights.

If the primary brake or the EBP fails, the ADV 101 still continues to roll back with the rolling speed exceeding the second predetermined threshold V2 but lower than the third predetermined threshold V3, the status of the ADV may be changed to be in the third status. Based on the third status of the ADV 101, the redundant holding control may be in the third stage 703, in which the secondary brake 413 may be activated to try to quickly stop the ADV 101 since the situation may be dangerous. For example, the second predetermined speed threshold may be 2, 3, 4, or 5 kph or other value. The control system of the ADV may generate a third warning message (e.g., Message-3), for example, with a loud voice and rapid flashing lights. If the ADV 101 comes to a standstill, the parking brake 414 may be activated to hold the ADV, as illustrated in 810.

If all the brakes still cannot hold the ADV 101 from rolling, the ADV 101 continues to roll back with the rolling speed exceeding the third predetermined threshold V3. The ADV 101 may be close to the obstacle 802 and about to hit the obstacle 802, e.g., the obstacle behind. The status of the ADV may be changed to be in the fourth status. Based on the fourth status of the ADV 101, the redundant holding control may be in the fourth stage 704, in which the engine brake 415 may be activated to reduce the crash damage. The control system of the ADV may generate a fourth warning message (e.g., Message-4), for example, with alarming sound and rapidly flashing lights.

Figure 8B:
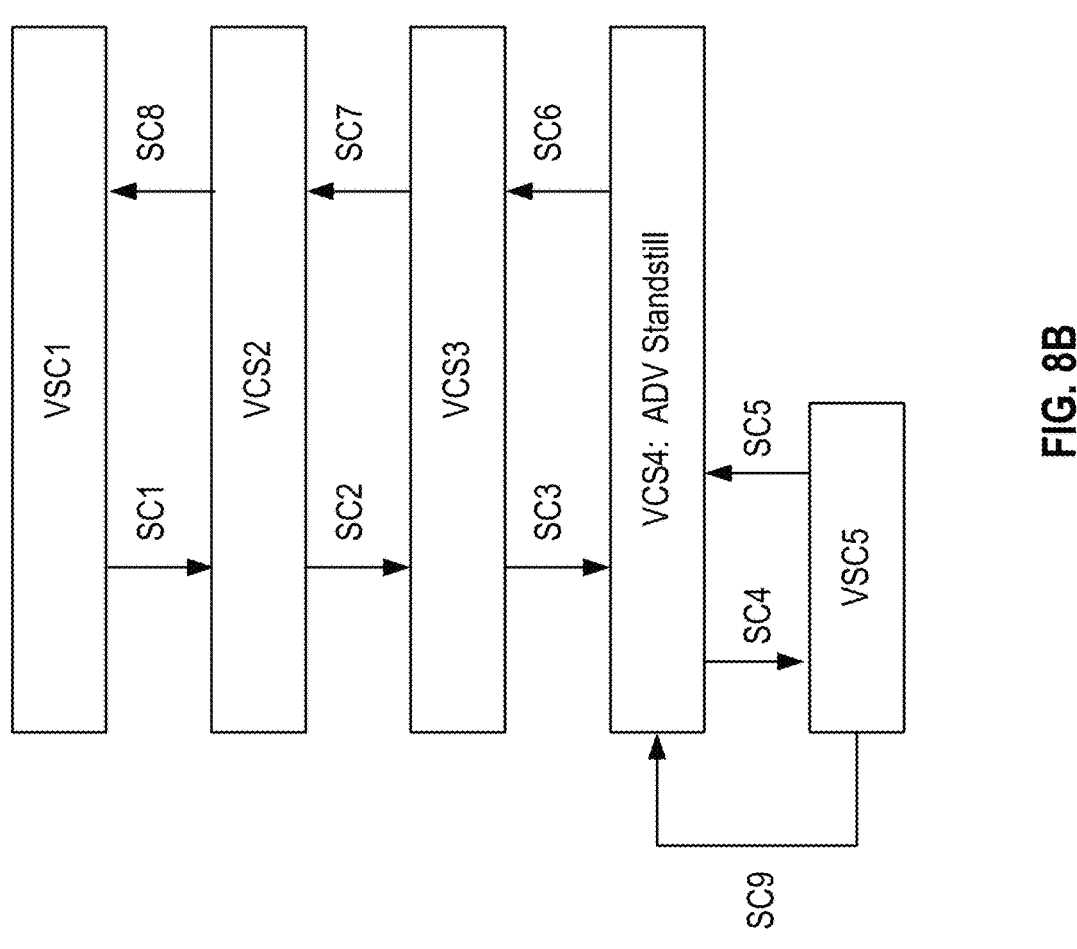
FIG. 8B illustrates a state diagram of an autonomous driving vehicle using a redundant holding control, according to embodiments of the present disclosure.

FIG. 8B illustrates a state diagram 800B of an autonomous driving vehicle using a redundant holding control, according to embodiments of the present disclosure. One or more wheel sensors may be used to detect a very low speed of the ADV when the ADV initially starts rolling. The wheel sensors may generate magnetic pulses in the form of waves, proportional to the speed of the ADV. The ADV may be in different states based on the speed of the ADV, and different holding control techniques may be applied accordingly.

Referring to FIG. 8B, the ADV 101 may be held to a standstill at a state VCS4. One or more of the ADV's wheel sensors, which may be located at each of the wheels (i.e., front left (FL), front right (FR), rear left (RL), rear right (RR) wheel), may be used to detect the rolling speed of the ADV based on pulses detected. In one or more embodiments, when at least two diagonal wheel sensors (e.g., FL & RR or FR & RL) may detect pulses within a first time period, a trigger SC4, where "SC" stands for "status condition," may happen, in which the ADV may change to the state VCS5, where "VCS" stands for "vehicle control state" or "vehicle condition status," in which the ADV is rolling. For example, the first time period may be 250 ms, 350 ms, 450 ms, 550 ms, 650 ms, or another value. A trigger SC6 from the state VCS4 to a state VCS3 may not be allowed.

While in the state VCS5, when no wheel sensors detect any pulses for a second period of time, a trigger SC5 may happen, in which the ADV may change back to the state VCS4. However, when the rolling speed is larger than a first speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or another value.

While in the state VCS3, when no wheel-sensors may detect any pulses for the second period of time, a trigger SC3 may happen, in which the ADV may change back to the state VCS4; when the rolling speed is larger than a second speed (e.g., 1.5, 2, or 2.5 kph), a trigger SC7 may happen, in which the state of the ADV may change to a state VCS2.

While in the state VCS2, when the rolling speed is less than the second speed (e.g., 1.5, 2, or 2.5 kph), a trigger SC2 may happen, in which the ADV may change back to the state VCS3; when the rolling speed is larger than a third speed (e.g., 5, 6, 7, 8, 9, or 10 kph), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

Different brakes may be activated based on different states of the ADV. For example, when the ADV is at the state VSC5, the redundant holding control may be in the first stage 701, and the primary brake 411 may be used. When the ADV is at the state VSC3, the redundant holding control may be in the second stage 702, and the EPB 412 may be activated. When the ADV is at the state VSC2, the redundant holding control may be in the third stage 703, in which the secondary brake 413 may be activated. When the ADV is at the state VSC1, the redundant holding control may be in the fourth stage 704, and the engine brake 415 may be activated.

Figure 9A:
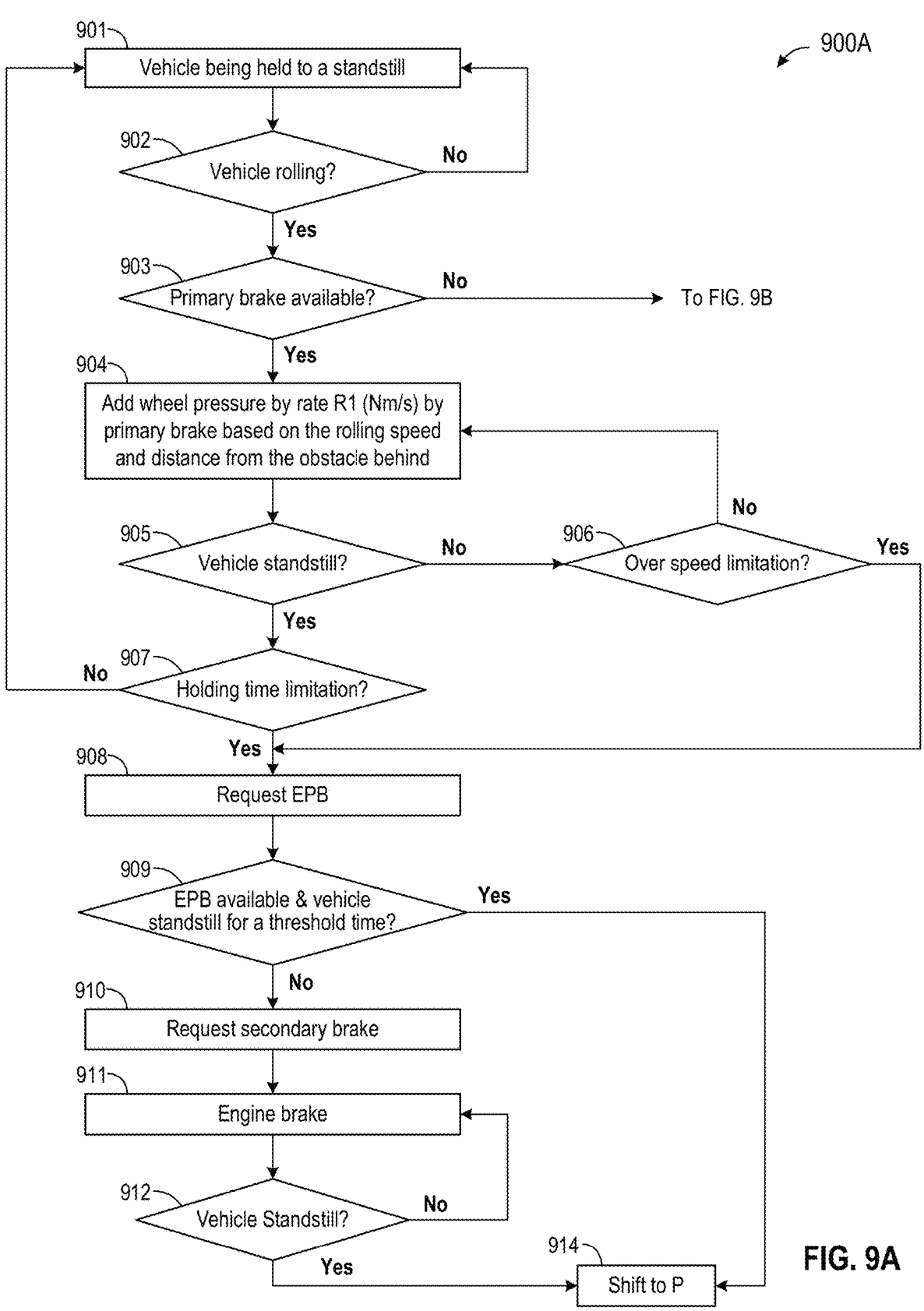
FIGS. 9A & 9B are flow diagrams illustrating an example of using a redundant holding control of an autonomous driving vehicle, according to embodiments of the present disclosure.
Figure 9B:
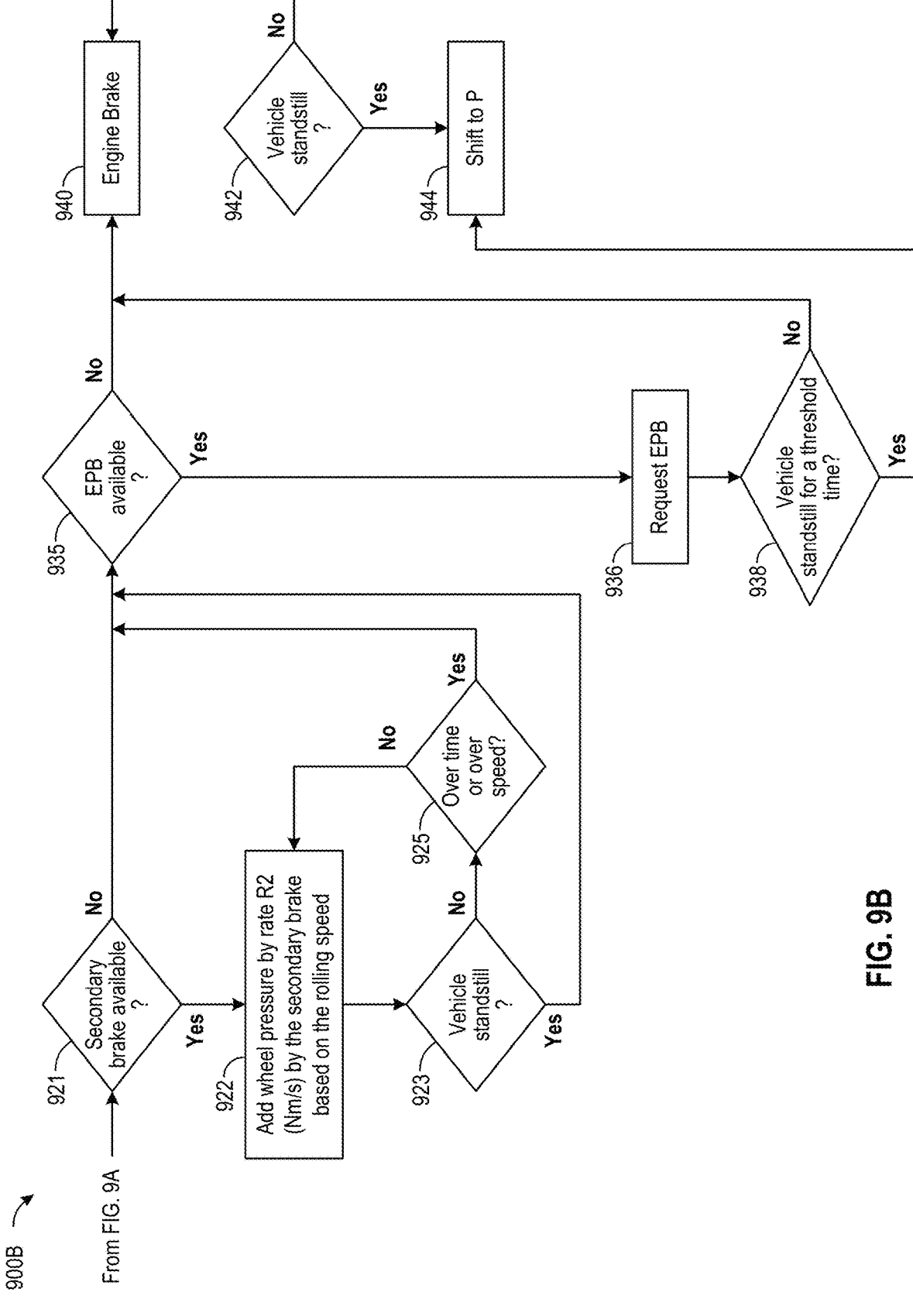

FIGS. 9A and 9B are flow diagrams illustrating an example of using a redundant holding control of an autonomous driving vehicle, according to embodiments of the present disclosure. By using the redundant holding control, both the safety and the comfort of the passenger of the ADV may be considered.

Referring to FIG. 9A, at block 901, the ADV 101 may be supposed to be held to a standstill. At block 902, the sensors of the ADV 101 may detect the rolling speed of the ADV to determine if the ADV is rolling. At block 903, if the sensors detect the ADV is rolling, whether the primary brake is available may be determined.

At block 904, when the primary brake is available, the primary brake may be used to add the wheel pressure slowly, for example, below the first predetermined rate threshold R1 (Nm/s) based on the rolling speed lower than the first predetermined speed threshold V1 and/or the distance from the closest obstacle behind larger the first predetermined distance threshold. The situation when the primary brake is not available will be discussed in FIG. 9B.

At block 905, whether the ADV is at a standstill may be determined. At block 906, if the ADV is not at a standstill, whether the rolling speed is larger than the first predetermined speed threshold V1 may be determined. At block 907, if the ADV is at a standstill, whether the holding time limitation of the primary brake is reached may be determined.

At block 908, if the rolling speed exceeds the first predetermined speed threshold V1 or the holding time limitation of the primary brake is reached, the EPB may be requested or activated to hold the ADV.

At block 909, whether the EPB is available and the ADV is at a standstill for a predetermined threshold time may be determined. For example, the predetermined threshold time may be 1, 2, 3, 4, 5, 10 minutes, or other value. If the EPB is available (e.g., being activated) and the ADV is at a standstill for the predetermined threshold time, the parking may be activated by shifting to "park", as illustrated in block 914.

At block 910, if the ADV is not at a standstill for the predetermined threshold time, for example, the ADV still continues to roll, the secondary brake may be requested and/or activated to stop the ADV.

At block 911, if all the above brakes still cannot hold the ADV from rolling, the engine brake may be activated/used to reduce the crash damage. At block 912, whether the ADV is at a standstill may be determined. At block 914, if the ADV is at a standstill, the parking may be activated by shifting to "park".

Referring to FIG. 9B, at block 921, in the situation when the primary brake is not available, whether the secondary brake is available may be determined. At block 922, when the secondary brake is available, the secondary brake may be activated/used to add the wheel pressure below the second predetermined rate threshold R2 (Nm/s) based on the rolling speed lower than the first predetermined speed threshold V1 and/or the distance from the closest obstacle behind larger the first predetermined distance threshold. As discussed above in connection with FIG. 8A, the first predetermined speed threshold V1 may be 0.1, 0.2, 0.5, or 1 kilometers per hour (kph) or other value.

At block 923, whether the ADV is at a standstill may be determined. If the ADV is at a standstill, the ADV may determine whether the EPB is available, as illustrated at block 935. If the ADV is not at a standstill, whether the rolling speed exceeds the first predetermined speed threshold V1 or the holding time limitation of the secondary brake is reached may be determined, as illustrated at block 925. If the rolling speed does not exceed the first predetermined speed threshold V1 and the holding time limitation of the secondary brake is not reached, the ADV may go back to the operation at block 922 by adding the wheel pressure below the second predetermined rate threshold. If the rolling speed exceeds the first predetermined speed threshold V1 or the holding time limitation of the secondary brake is reached, the ADV may determine whether the EPB is available, as illustrated at block 935.

At block 936, if the EPB is available, the EPB may be requested or activated. At block 938, whether the ADV is at a standstill for a predetermined threshold time may be determined. For example, the predetermined threshold time may be 1, 2, 3, 4, 5, 10 minutes, or other value. If the ADV is at a standstill for the predetermined threshold time, the parking may be activated by shifting to "park", as illustrated in block 944.

At block 940, if the ADV is not at a standstill for the predetermined threshold time (e.g., the EPB still cannot hold the ADV) or the EPB is not available, the engine brake may be activated to reduce the crash damage. At block 942, whether the ADV is at a standstill may be determined. If the ADV is not at a standstill, the engine brake may be continued to be activated. At block 944, if the ADV is at a standstill, the parking may be activated by shifting to "park".

FIG. 10 is a flow diagram illustrating an example of a process 1000 of performing a redundant holding control to prevent rolling of an autonomous driving vehicle, according to embodiments of the present disclosure. Process 1000 may be performed by processing logic which may include software, hardware, or a combination thereof. For example, process 1000 may be performed by the control module 306 and the brake unit 203, as illustrated in FIG. 4B. Referring to FIG. 10, in operation 1001, processing logic receives data from a plurality of sensors mounted on the ADV being held at a standstill.

In operation 1002, processing logic detects a status of the ADV including a rolling speed of the ADV based on the data from the plurality of sensors.

In operation 1003, processing logic activates one of a primary brake or a secondary brake, in response to detecting the status of the ADV being a first status including the rolling speed being higher than zero and lower than a first predetermined speed threshold.

In operation 1004, processing logic activates an electronic parking brake, in response to detecting the status of the ADV being a second status including the rolling speed being higher than the first predetermined speed threshold and lower than a second predetermined speed threshold.

In one or more embodiments, processing logic may determine whether the primary brake is available in response to detecting the rolling speed being higher than zero. In one or more embodiments, processing logic may activate the primary brake in response to determining that the primary brake is available. In one or more embodiments, processing logic may activate the primary brake including applying a wheel pressure below a predetermined rate threshold. In one or more embodiments, processing logic may activate the secondary brake, in response to determining the status of the ADV being a third status including the rolling speed being higher than the second predetermined speed threshold and lower than a third predetermined speed threshold. In one or more embodiments, processing logic may activate an engine brake, in response to determining the status of the ADV being a fourth status including the rolling speed being higher than the third predetermined speed threshold, as illustrated in operation 1005. In one or more embodiments, processing logic may activate a parking brake, in response to determining the rolling speed being zero.

In one or more embodiments, processing logic may activate the secondary brake in response to determining that the primary brake is not available. In one or more embodiments, processing logic may activate the secondary brake including applying a wheel pressure below a predetermined rate threshold. In one or more embodiments, processing logic may activate an engine brake, in response to determining the rolling speed being higher than the second predetermined speed threshold.

In one or more embodiments, processing logic may generate a first warning message with a first level of warning in response to detecting the status of the ADV being the first status. In one or more embodiments, processing logic may generate a second warning message with a second level of warning in response to detecting the status of the ADV being the second status, where the second level of warning is higher than the first level of warning. In one or more embodiments, processing logic may generate a third warning message with a third level of warning in response to detecting the status of the ADV being a third status including the rolling speed being higher than the second predetermined speed threshold and lower than a third predetermined speed threshold, where the third level of warning is higher than the second level of warning. In one or more embodiments, processing logic may generate a fourth warning message with a fourth level of warning in response to detecting the status of the ADV being a fourth status including the rolling speed being higher than the third predetermined speed threshold, where the fourth level of warning is higher than the third level of warning.

By this process, both the safety and the comfort of the occupant or passenger of the ADV may be considered. Different actions may be performed according to different stages of the redundant holding control based on the status of the ADV, thereby balancing the safety and the comfort of the occupant or passenger of the ADV.

B. Embodiments of ADV Smooth Drive-Off from a Standstill

As noted above, smooth and agile acceleration of an ADV that is being held at a standstill or is otherwise at a stop is important for ADV safety, efficiency, and occupant enjoyment. But, accelerating from a stopped position (also known as "drive off") is a complex matter. The ADV cannot move forward immediately even though the ADV's control system initiates an acceleration command because of an excess of residual brake torque. Also, if the brake torque is released too quickly, there may be an uncomfortable acceleration (e.g., a sudden jerk forward) or slipping if propulsion torque is applied too quickly.

Figures 11A, 11B:
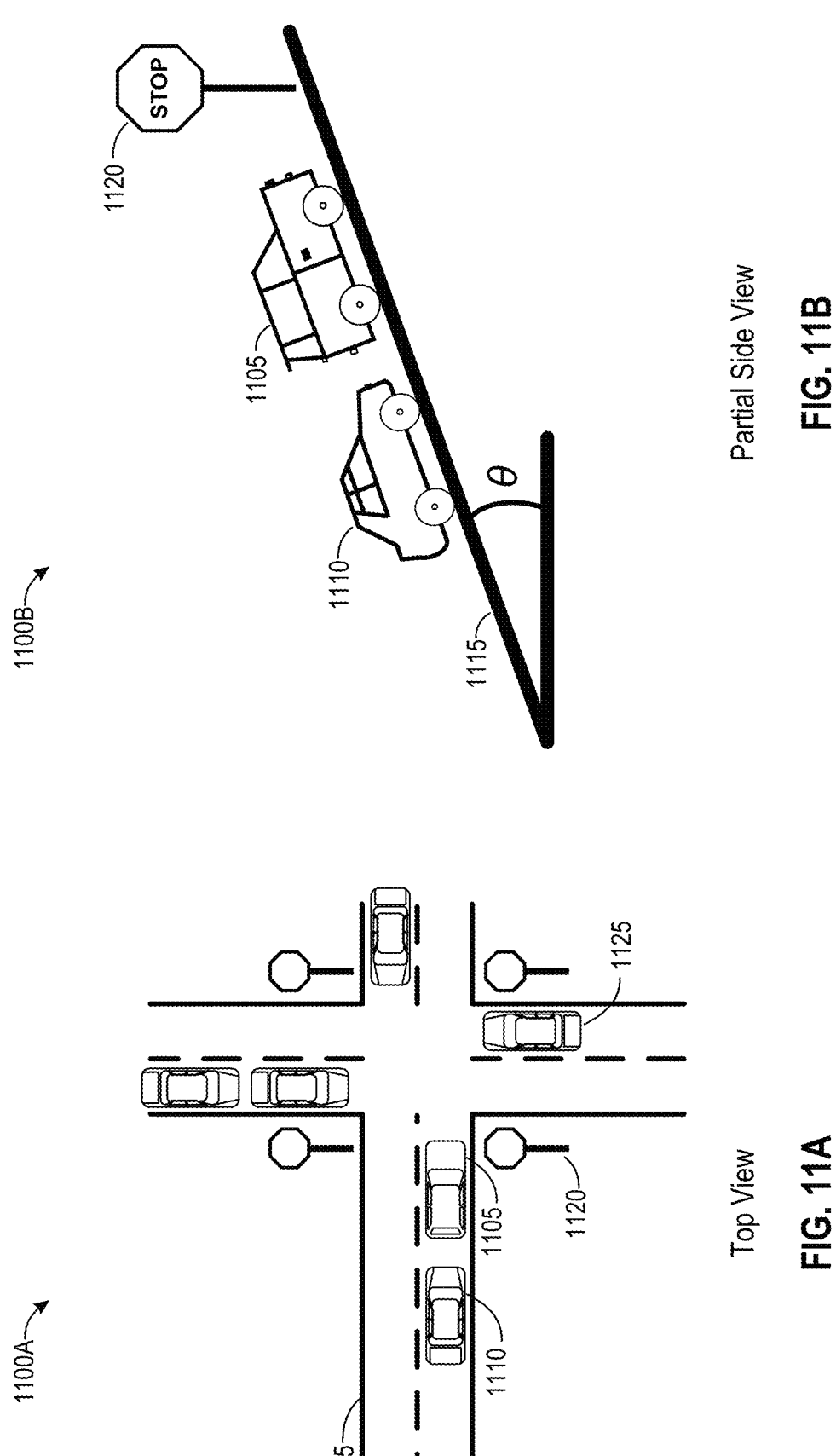
FIG. 11A (top view) and 11B (partial side view) depict an autonomous driving vehicle that is stopped at a 4-way stop intersection.

Accelerating from a stop for an ADV requires considering a number of factors. Consider, by way of example, an ADV that is stopped at an intersection, particularly an uncontrolled intersection in which there are no electronically controlled right-of-way indicators. FIGS. 11A and 11B depict an ADV 1105 that is stopped at a 4-way stop intersection. FIG. 11A depicts a top view 1100A, and FIG. 11B depicts a partial side view. Note that, in such situations, if the ADV has too slow of an acceleration from the stop position, another vehicle (e.g., vehicle 1125) may proceed before the ADV even if it was properly the ADV's turn to advance through the intersection. In such a scenario, it is not uncommon for the ADV to be stuck at the intersection for a long time as successive drivers perceive the slow drive-off reaction of the ADV as the ADV yielding the right-of-way to them.

To add to the complexity, consider a situation in which the ADV 1105 is stopped on a surface 1115 with a significant positive slope angle, θ. The ADV must contend with the added force due to gravity pulling the ADV backward down the slope. Too much acceleration may cause slipping and too little acceleration may cause the ADV to roll back into a vehicle behind it (e.g., car 1110). Thus, the ADV control system should disengage the brake in concert with engaging the engine torque in a coordinated and controlled manner. Ideally, the ADV should advance in a soft, agile, smooth, and safe manner from the stop regardless of the degree of angle, θ. Embodiments herein provide systems and methods to facilitate a pleasant and comfortable ride while having the ADV drive off smoothly (e.g., not a large jerk) and safely (e.g., not slipping) while driving from a stop-regardless of whether the ADV is on a slope or on a neutral (i.e., not sloped) surface.

Figure 12:
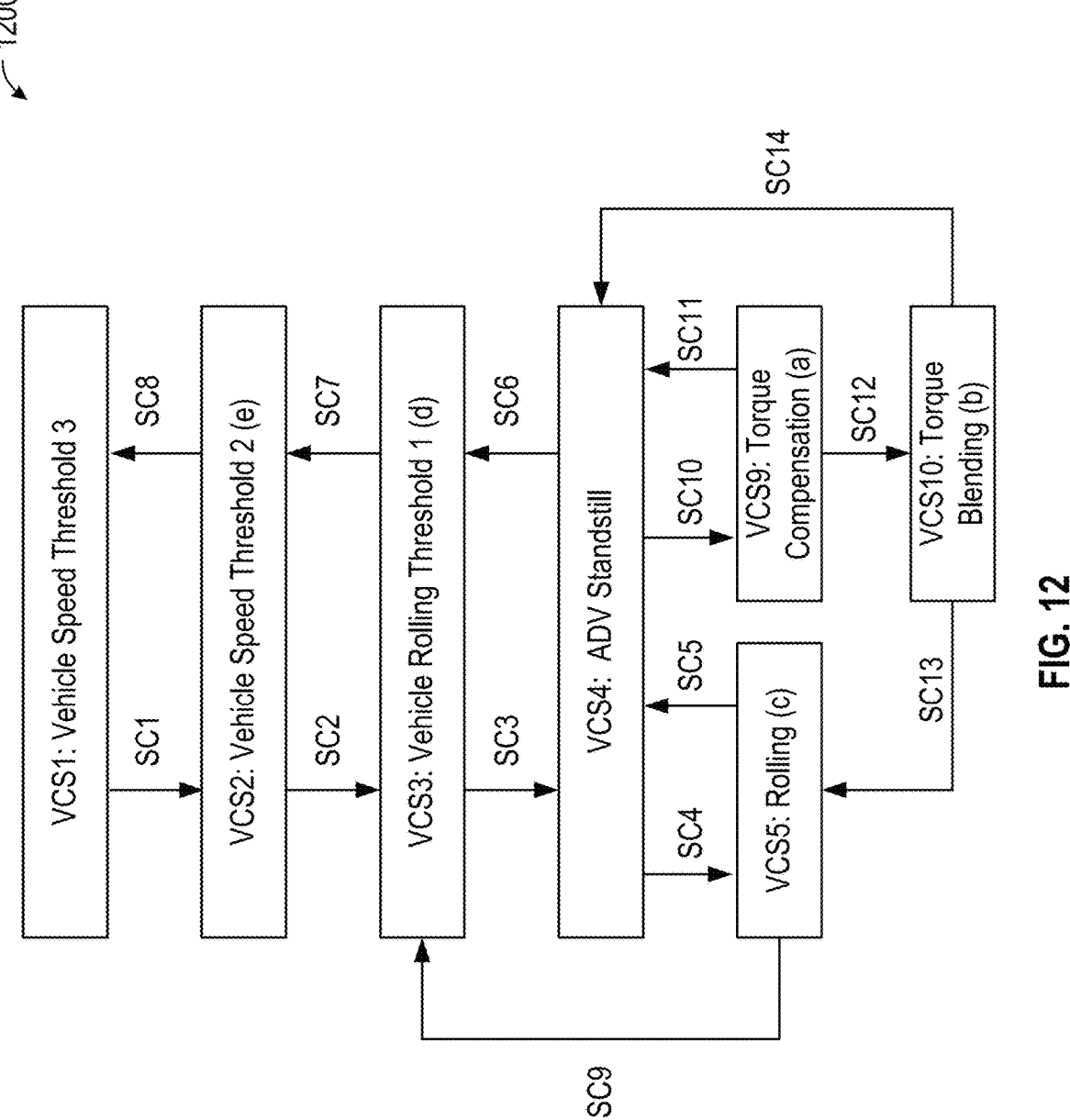
FIG. 12 depicts a state diagram for an ADV for drive-off control, particularly on a positive slope angle, according to embodiments of the present disclosure.

FIG. 12 depicts a diagram 1200 related to conditions for a controller of an ADV for implementing drive-off control, particularly on a positive slope angle, according to embodiments of the present disclosure. The depicted control flow 1200 may be implemented in a similar manner as discussed above with respect to FIG. 8B; however, it shall be noted that the embodiment depicted in FIG. 8B is used for different purposes (i.e., related to braking) than the embodiment depicted in FIG. 12, which is related to controls for drive-off, as discussed in more detail below; thus, it shall be noted that the values associated with FIG. 12 may be different than those associated with FIG. 8B even if the same descriptors and reference indicators are used. FIG. 12 is favorably viewed in conjunction with FIG. 13, which depicts examples of brake torque versus time 1300A and corresponding wheel torque versus time 1300B, according to embodiments of the present disclosure. It shall be noted that different brake-torque-vs-time profiles/functions and wheel-torque-vs-time profiles/functions may be applied.

Referring to FIG. 12, the ADV may be at a standstill or stop at a state VCS4. During this time period, the wheel torque may be zero 1301, and the brake torque may be at a level 1302 that is sufficient to maintain the ADV at a stop. In one or more embodiments, a drive-off request SC10 to drive-off/accelerate from the stopped or standstill state VCS4 is received (e.g., point 1305 in FIG. 13). The drive-off request SC10 may be received from (or generated by) user input or the ADS (e.g., ADS 110 or a module thereof, such as the planning module).

In one or more embodiments, the state VCS9 represents a torque compensation stage on a positive slope. Because some amount of gap or play exists in all gearing, the torque compensation stage causes the gears to engage to begin to transfer torque, but typically there is no movement of the ADV yet. In one or more embodiments, during the VCS9 stage, the ADV may apply engine torque at a first drive-off torque rate (e.g., DTR1), which may be based upon wheel torque of the wheels and may be based upon the rate at which torque is to be applied. An example DTR1 value may be approximately 7300 Nm/s.

Note that, if the drive-off request is canceled (e.g., by a user or by the ADS planner module) while in the torque compensation stage VCS9, a trigger SC11 may occur, which puts the ADV back to the state VCS4. In the depicted embodiment in FIG. 13, the first drive-off torque rate is depicted as being linear; however, it shall be noted that different functions or models may be employed.

In one or more embodiments, once the ADV has reached a wheel torque threshold value (see point 1310 in FIG. 13), a trigger SC12 may cause the ADV to transition to the state VCS10, which may be referred to as the torque blending stage. The torque blending stage involves releasing the brake pressure smoothly while the wheel torque rises. In the embodiment depicted in FIG. 13, two actions may occur during the torque blending stage VCS10. One action that occurs during stage VCS10 is that the brakes on the ADV start 1303 to release braking pressure at a first brake torque release rate (e.g., BTR1), and the other action that occurs is that torque pressure may be applied at a second drive-off torque rate (e.g., DTR2), which may be based upon wheel torque of the wheels and may be based upon the rate at which torque is to be applied. An example DTR2 value may be approximately 1450 Nm/s. In one or more embodiments, BTR1 may be determined relative to DTR2. For example, in one or more embodiments, BTR1 may be determined as follows:

$$BTR1 = \phi \times DTR2; \text{ or}$$

$$BTR1 = F(DTR2)$$

where $\phi$ is a coefficient applied to DTR2 and F represents a function or machine learning model that determines BTR1 given DTR2 as an input. It shall be noted that F may take other inputs, including but not limited to vehicle mass, acceleration, speed, road conditions, etc. (which values may be preset or may be determined in real-time or near real-time).

Figure 13:
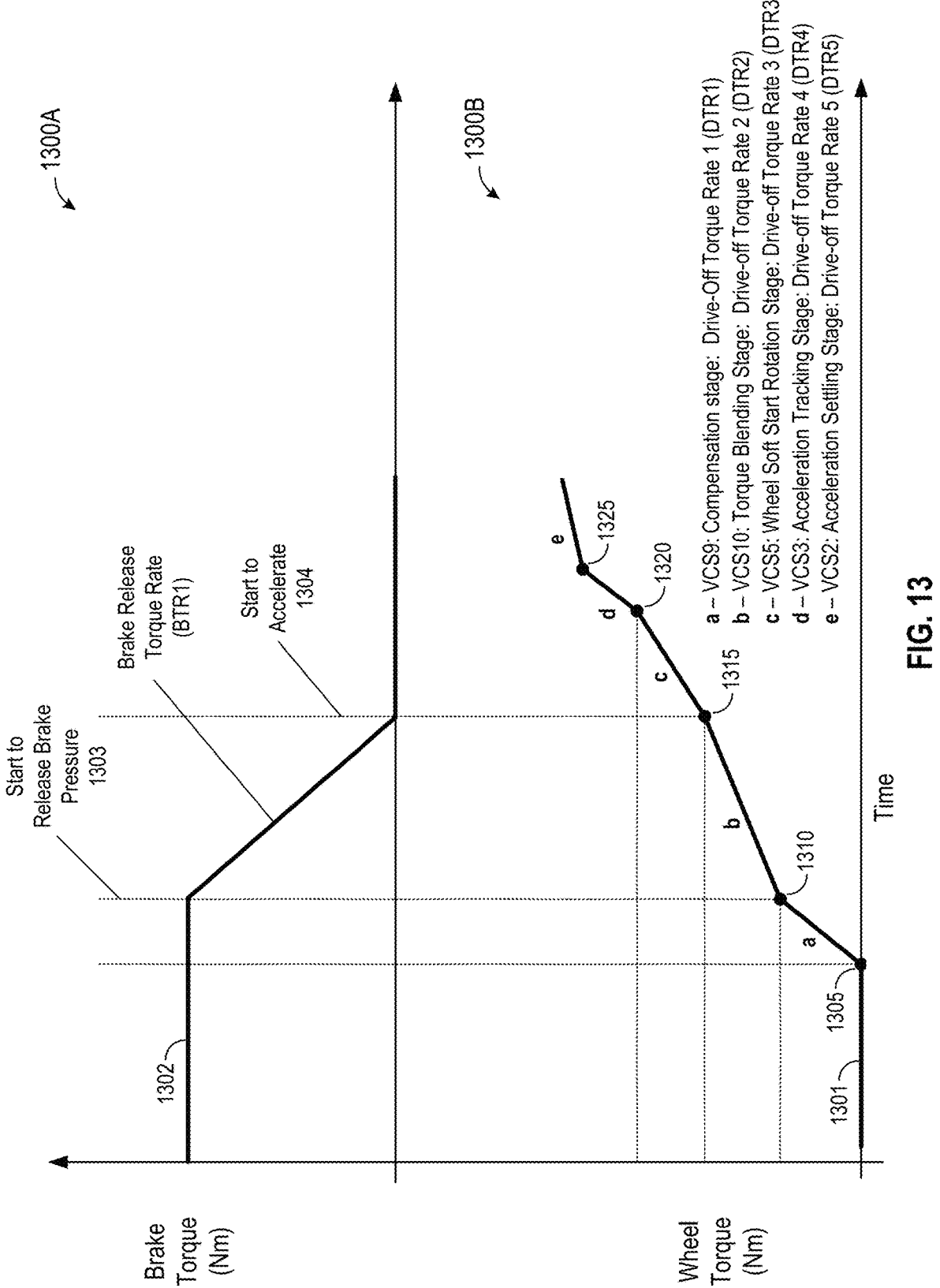
FIG. 13, which depicts examples of brake torque versus time 1300A and corresponding wheel torque versus time 1300B, according to embodiments of the present disclosure.

In the depicted embodiment in FIG. 13, both the brake torque release rate and the second drive-off torque rate are depicted as being linear; however, it shall be noted that different functions or models may be employed.

Note that, if the drive-off request is canceled (e.g., by a user or by the ADS planner module) while in the torque blending stage VCS10, a trigger SC14 may occur, which puts the ADV back to the state VCS4.

In one or more embodiments, one or more wheel sensors may be used to detect a speed of the ADV. The wheel sensors may generate magnetic pulses in the form of waves, proportional to the speed of the ADV. The ADV may be in different states based on the speed of the ADV. For example, one or more of the ADV's wheel sensors, which may be located at each of the wheels (i.e., front left (FL), front right (FR), rear left (RL), rear right (RR) wheel), may be used to detect the rolling speed of the ADV based on pulses detected.

Figure 14:
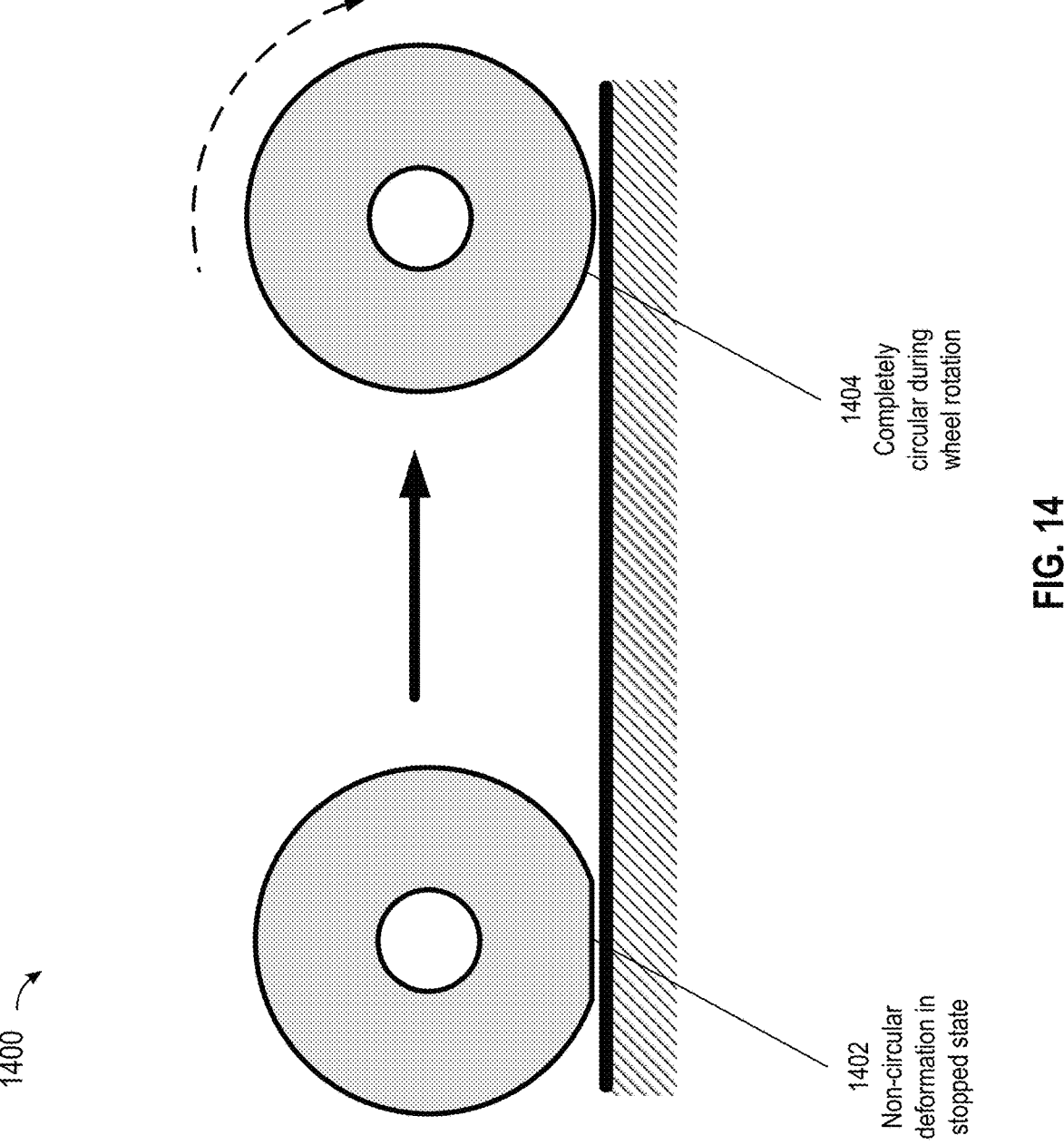
FIG. 14 depicts an issue related to the non-circularity of wheels as a result of being stopped, according to embodiments of the present disclosure.

In one or more embodiments, when at least a pair of diagonal wheel sensors (e.g., FL & RR or FR & RL) detects pulses within a first time period, a trigger SC13 may happen, in which the ADV may change to the state VCS5 in which the ADV is rolling 1315 (i.e., starts to accelerate 1304 in FIG. 13). For example, the first time period may be 250 ms, 350 ms, 450 ms, 550 ms, 650 ms, or another value. Note that, in one or more embodiments, a trigger SC6 from the state VCS4 to a state VCS3 may not be allowed. In one or more embodiments, the state VCS5 represents a wheel soft start rotation stage, which may be implemented with a third drive-off torque rate (e.g., DTR3), which may be based upon wheel torque of the wheels and may be based upon the rate at which torque is to be applied. An example DTR3 value may be approximately 1900 Nm/s. Because the ADV has been at a standstill, the bottom portion of the wheel resting against the road surface is deformed with a slight, flat portion. It is not until after the wheel starts rolling that it resumes its more circular shape. The issue is graphically depicted in FIG. 14, which shows the initial, deformed/non-circular wheel shape 1402 when the ADV is at a standstill, and the same wheel 1404 being more circular once rotating. Recognition of this hysteresis is helpful to aid in smooth drive-off and stage VCS5 helps compensate for this issue.

While in the state VCS5, when no wheel sensors may detect any pulses for a second period of time, a trigger SC5 may happen, in which the ADV may change back to the state VCS4; however, in one or more embodiments, when the rolling speed is larger than a first threshold speed (e.g., 0.5, 1, or 1.5 kph), a trigger SC9 may happen, in which the state of the ADV may change to the state VCS3. For example, the second time period may be 50 ms, 150 ms, 250 ms, 350 ms, 450 ms, or another value. In one or more embodiments, the state VCS3 may be referred to as the acceleration tracking stage and may employ a fourth drive-off rate (e.g., DTR4), which may be based upon wheel torque of the wheels and may be based upon the rate at which torque is to be applied. An example DTR4 value may be approximately 2900 Nm/s. In this stage, a soft drive-off is provided without wheel slip or jerking motion.

While in the state VCS3, when no wheel sensors may detect any pulses for a period of time (e.g., 180 milliseconds (ms)), a trigger SC3 may happen, in which the ADV may change back to the state VCS4 (i.e., standstill). However, when the rolling speed is larger than a second speed (e.g., 1.5, 2, or 2.5 kph), a trigger SC7 may happen, in which the state of the ADV may change to a state VCS2. In one or more embodiments, the state VCS2 may be referred to as the acceleration settling stage and may employ a fifth drive-off rate (e.g., DTR5), which may be based upon wheel torque of the wheels and may be based upon the rate at which torque is to be applied. An example DTR5 value may be approximately 1000 Nm/s. This stage allows for agile and smooth acceleration to a target level.

While in the state VCS2, when the rolling speed is less than the second speed (e.g., 1.5, 2, or 2.5 kph), a trigger SC2 may happen, in which the ADV may change back to the state VCS3. However, in one or more embodiments, when the rolling speed is larger than a third speed (e.g., 2, 3, 4, 5 kph or other value), a trigger SC8 may happen, in which the state of the ADV may change to a state VCS1. While in the state VCS1, when the rolling speed is less than a fourth speed (e.g., 2, 3, or 4 kph), a trigger SC1 may happen, in which the ADV may change back to the state VCS2.

In one or more embodiments, the brake torque release rate (i.e., BTR1) and/or one or more of the drive-off threshold values may, alternatively or additionally, be related to the slope angle, θ. For example, in one or more embodiments, the brake torque release rate and the drive-off threshold rates may be as follows:

$$BTR1 = B1 \times \theta$$

$$DTRn = Dn \times \theta$$

In one or more embodiments, the brake torque release rate (i.e., BTR1) and/or one or more of the drive-off threshold values may be based upon a function or machine learning model that receives one or more inputs (e.g., wheel torque value(s), slope angle, desired performance (e.g., faster or slower acceleration rates), road conditions, traffic conditions, etc.) to determine the values.

In one or more embodiments, the wheel torque threshold value 1310 may also be based upon one or more parameters. The wheel torque threshold value ($T_{wheel\_torque}$) may be based upon or related to the braking torque (e.g., $T_{wheel\_torque}=\alpha T_{brake\_torque}$), where $T_{brake\_torque}$ represents the braking torque value and a represents a coefficient (which may be preset) or a function that determines a coefficient value to multiple with the braking torque. The wheel torque threshold value may be computed in real-time or near real-time using one or more sensors to gauge the braking torque and any factors relevant to the function, a, which may be determined using input parameters such as road conditions, weather conditions, engine type, braking conditions, etc. Alternatively or additionally, the wheel torque threshold value ($T_{wheel\_torque}$) may be related to slope angle (i.e., θ) and vehicle mass. In one or more embodiments, the vehicle mass may be a preset value for the mass of the ADV. Alternatively, the mass value may be determined in real-time or near real-time using one or more sensors of the ADV. For example, previous occurrences of acceleration, deceleration, and/or braking may be used to obtain values, using ADV sensors, to compute a mass value for the vehicle, including its cargo (i.e., occupants and other baggage).

Although it shall be noted that for the rates and values discussed herein, different values and/or different formulas or models may be used. In one or more embodiments, one or more of the rates (i.e., BTR1 and DTRn) or values (e.g., $T_{wheel\_torque}$) may be obtained by using a look-up table that utilizes one or more parameters to look-up a value for a rate. Factors such as number and/or types of brakes employed, weight/mass of the vehicle (and occupants), slope angle, road conditions, weather conditions (e.g., raining), safety (e.g., need for acceleration due to safety issues), traffic conditions, etc. may be considered. In one or more embodiments, the rates and values may be determined using one or more machine learning models.

Figure 15:
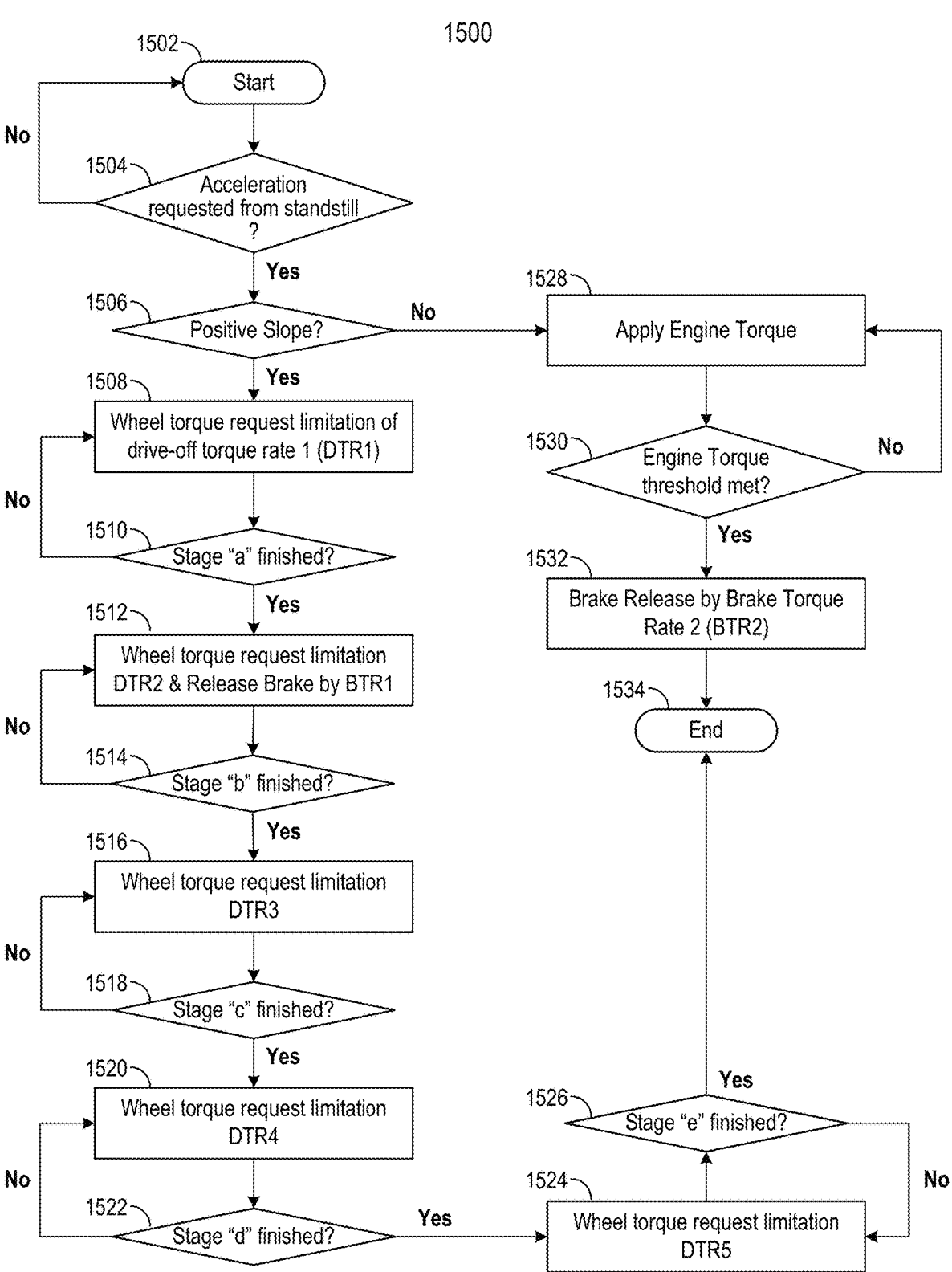
FIG. 15 depicts an alternative methodology for drive-off of an autonomous driving vehicle, according to embodiments of the present disclosure.

FIG. 15 depicts an alternative methodology, according to embodiments of the present disclosure. In one or more embodiments, the overall process 1500 may start (1502) or be operating while the ADV is at a standstill/stop. The process may be waiting until a request to accelerate is received (1504). In one or more embodiments, a determination may be made (1506) whether the ADV is at a positive slope angle, which may be determined using one or more sensors. For example, the gradient value of the slope angle may be determined using one or more IMU sensors or high-intensity maps and GPS.

If the gradient/slope angle is greater than or equal to a preset threshold (e.g., 2 to 5 degrees), the slope is deemed to be positive, and if it is positive, a wheel torque request limitation is set (1508) at a first drive-off torque rate (e.g., DTR1), which continues (1510) until the end of a first stage, stage "a," which may be considered to correspond to a torque compensation stage (e.g., VCS9 in FIG. 12). In one or more embodiments, stage "a" may be deemed to have concluded when a wheel torque threshold value (see, e.g., point 1310 in FIG. 13) has been reached.

Responsive to stage "a" finishing (1510), a wheel torque request limitation is set (1512) at a second drive-off torque rate (e.g., DTR2) and the braking is released at a first brake release rate (e.g., BTR1). This process continues (1514) until the end of a second stage, stage "b," which may be considered to correspond to a torque blending stage (e.g., VCS10 in FIG. 12).

Responsive to stage "b" finishing (1514), a wheel torque request limitation is set (1516) at a third drive-off torque rate (e.g., DTR3), which continues (1518) until the end of a third stage, stage "c," which may be considered to correspond to a torque blending stage (e.g., VCS5 in FIG. 12).

Responsive to stage "c" finishing (1518), a wheel torque request limitation is set (1520) at a fourth drive-off torque rate (e.g., DTR4), which continues (1522) until the end of a fourth stage, stage "d," which may be considered to correspond to an acceleration tracking stage (e.g., VCS3 in FIG. 12).

Responsive to stage "d" finishing (1522), a wheel torque request limitation is set (1524) at a fifth drive-off torque rate (e.g., DTR5), which continues (1526) until the end of a fourth stage, stage "e," which may be considered to correspond to an acceleration settling stage (e.g., VCS2 in FIG. 12).

It shall be noted that while FIG. 15 ends (1532) after stage "e," one or more additional stages or other processes may be performed.

If the gradient/slope angle is (1506) not greater than or equal to the preset threshold value, the slope may be deemed to be flat or negative. In one or more embodiments, the ADS may begin to apply (1528) engine torque. In one or more embodiments, a check may be made (1530) to determine whether an engine torque threshold has been met (1528). When an acceleration request has been made, this check determines whether it reaches a set threshold (e.g., approximately 1-2%); this setting helps to avoid a mis-trigger of the acceleration and/or for potential noisy signals.

If the engine torque threshold has been met (1530), in one or more embodiments, the braking may be released (1532) according to a second braking release rate (e.g., BTR2). When the ADV is on a flat surface, the brake torque may be released immediately. When the ADV is on a negative surface, the brake torque may be released immediately or may be released according to a model or table that may use as inputs one or more parameters, such as the gradient of the slope angle, vehicle weight, road conditions, weather conditions, traffic conditions, etc., in like manner as described above related to BTR1.

As noted previously, the drive-off torque rates and the braking release rates may be set values, may be determined by one or more functions or models that utilize one or more parameters, and/or may be determined via a look-up table or tables.

Figure 16:
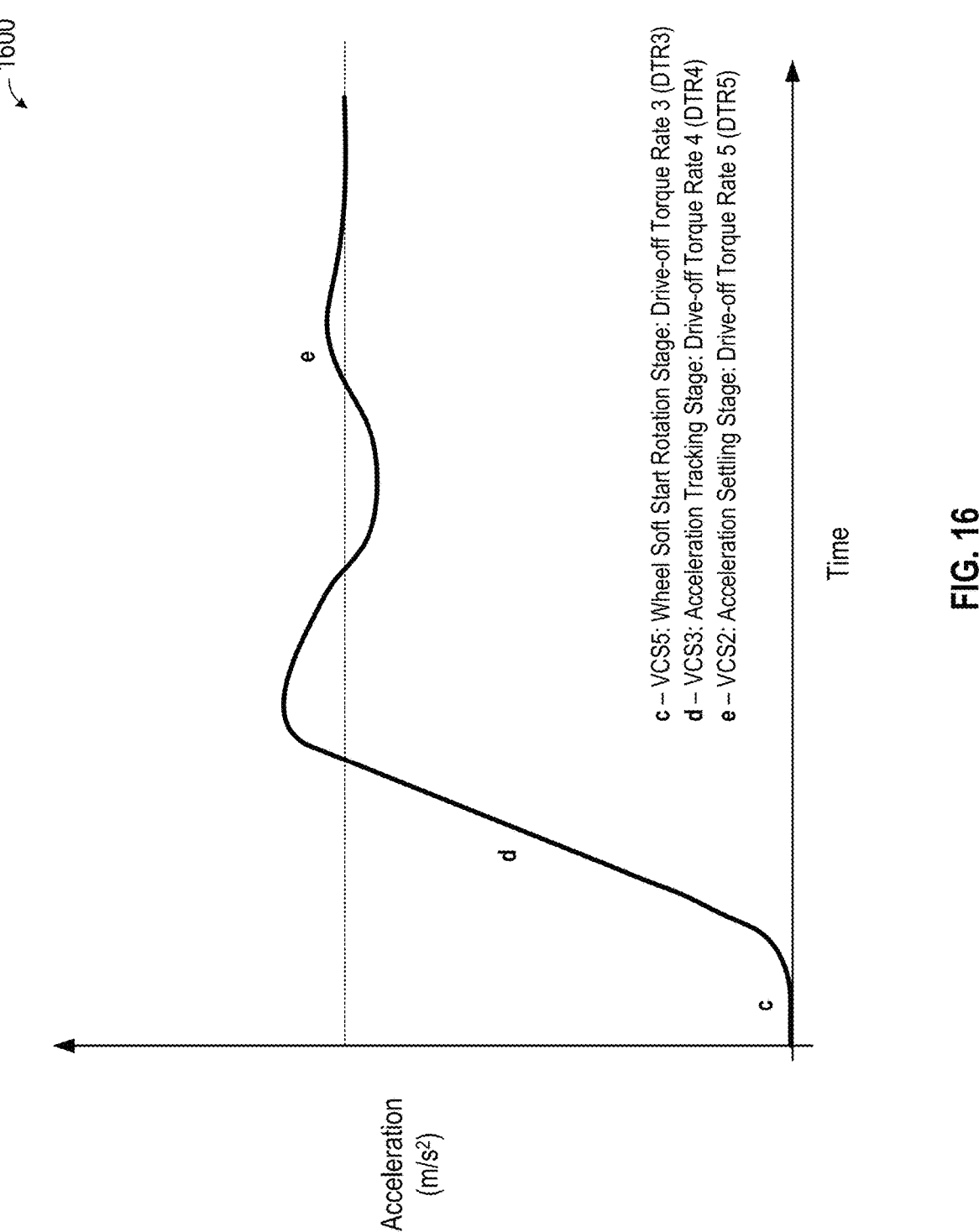
FIG. 16 depicts an example acceleration graph versus time, according to embodiments of the present disclosure.

FIG. 16 depicts an example acceleration graph versus time, according to embodiments of the present disclosure. The graph 1600 depicts an example acceleration profile that may result from the implementation of a methodology, such as depicted in FIG. 15. Note that the graph 1600 depicts the effects on acceleration during various stages (stages c, d, and e). It shall be noted that the graph 1600 is merely one example and different implementations of the stages will result in different acceleration profiles.

FIGS. 17A & 17B depict another methodology for facilitating a start from a stop position for an ADV, according to embodiments of the present disclosure. As depicted in FIG. 17A, a request to accelerate an autonomous driving vehicle (ADV) from a stop/standstill is received (1704), which may be received from the ADS (e.g., from a planning module of the ADS).

In one or more embodiments, the slope angle of the ADV is determined (1704) to ascertain whether the ADV is at a positive, neutral, or negative slope angle. The slope angle may be determined using one or more sensors, as discussed previously. Responsive to the ADV being deemed to be at a positive slope angle, an engine of the ADV may be activated (1706) to apply torque at a first torque rate (e.g., DTR1) to one or more wheels of the ADV.

In one or more embodiments, responsive to detecting, via one or more sensors, that the ADV has reached a wheel torque threshold value, the ADS may cause (1708) the engine of the ADV to apply torque at a second torque rate (e.g., DTR2) to one or more wheels of the ADV while deactivating or disengaging the brakes of the ADV at a brake release torque rate (e.g., BTR1).

In one or more embodiments, responsive to detecting the ADV starting to move/roll, which may be detected by one or more sensors of the ADV, the ADS may cause (1710) the engine of the ADV to apply torque at a third torque rate (e.g., DTR3) to one or more wheels of the ADV to cause the ADV to begin to accelerate.

In one or more embodiments, responsive to detecting the ADV achieving a first speed threshold based on data from one or more sensors, the ADS may cause (1712) the engine of the ADV to apply torque at a fourth torque rate (e.g., DTR4) to one or more wheels of the ADV.

In one or more embodiments, responsive to detecting the ADV achieving a second speed threshold based on data from one or more sensors, the ADS may cause (1714) the engine of the ADV to apply torque at a fifth torque rate (e.g., DTR5) to one or more wheels of the ADV. The ADS may continue to apply the fifth torque rate until a condition, such as a set speed, has been reached.

Turning now to FIG. 17B, if the slope angle of the ADV is determined (1704) to be a neutral or negative slope angle, the ADS may cause (1716) the braking torque to be deactivated or disengaged. The ADS may also cause (1718) wheel torque, via an engine, to be applied; however, given the neutral or negative slope angle, no torque blending phase may be needed as with a positive slope angle. In one or more embodiments, the rate of wheel torque that is applied may be related to one or more parameters, including but not limited to the value of the slope angle.

C. Additional Embodiments of ADV Smooth Drive-Off

Ensuring agile drive-off remains imperative for the safety and effectiveness of autonomous driving (AD) vehicles. The seamless and rapid, but smooth, acceleration holds vital significance in maintaining the operational integrity of AD vehicles. Furthermore, smooth drive-off helps enable consistent flow. In addition, there is an ever-increasing demand for AD vehicles, especially AD vehicles that operate safely, efficiently, and provide an enjoyable passenger experience.

However, of concern is the potential for rolling in an undesired direction during the drive-off phase-particularly when the AD vehicle is stopped on an incline. Addressing this challenge becomes pivotal in establishing drive-off control methodologies that not only uphold safety but also promote a comfortable ride experience.

The current approach to handling a vehicle rolling backward during a drive-off is to increase the brake pressure to stop the vehicle. Then, when the vehicle has stopped rolling backward, it accelerates to drive off. While such an approach may work, it is often not smooth.

In contrast, embodiments herein provide control methodologies that achieve a smooth, fast, and safe drive-off even rolling on a slope. Embodiments use one or more sensors to accurately detect any rolling when the vehicle is supposed to be stationary on an incline. Once detected, the system promptly engages one or more corrective measures to address the movement in the non-desired direction.

As noted above, an acceptable goal for a drive-off methodology is one in which there is a good balance between comfort for the passenger(s) and safety. In addition to comfort and safety, it is desirable to have methodologies that are efficient and reliable. When considering approaches for smooth drive-off to prevent rolling, one may initially consider using one or more brakes versus using engine torque. Braking has the benefits of being responsive (i.e., fast/quick) and can provide large amounts of torque. Given the rapidity at which high torque can be applied to the wheels, brakes are typically used in emergency situations; however, using brakes may not be efficient, may not be comfortable for the passenger(s), and while preventing rolling, do not help propel the vehicle in the desired direction, which is the goal of a drive-off request.

In contrast, engine torque, which may be applied in a comfortable and smooth manner, helps achieve the goal of driving off. However, even engine torque may have some issues. Typically, engine torque is a lower torque when compared to the torque that may be applied by brakes. Also, depending upon factors such as the road surface/friction, gradient on which the vehicle sits, rate at which engine torque is applied, etc., there may be vehicle slipping.

Accordingly, embodiments of the present patent document comprise methodologies for applying different configurations of engine torque and/or braking torque (using one or more braking systems) to address rolling when performing a vehicle drive-off. Embodiments intelligently and adaptively automatically control the vehicle based on various factors, including the vehicle's speed, the distance it has moved, and the characteristics of the road environment. These embodiments ensure that autonomous driving vehicles not only start their journey smoothly and agilely but also guarantee a safe and stable drive-off, even on sloped surfaces. Safety and comfort are prioritized, making these advancements instrumental in revolutionizing the autonomous driving experience.

It shall be noted that embodiments herein consider the issue of rolling when starting from a standstill. Embodiments are presented generally in the context of an AD vehicle driving forward from a standstill with the most problematic scenario being that the AD vehicle is on a positive slope. Under conditions when the vehicle is on a neutral or downward facing slope (i.e., negative slope angle), there will not be rolling backward, and typically, drive-off can occur by releasing the brake and gently applying engine torque (which application may be related to steepness of the negative slope, if any-less engine torque is needed if the negative slope is larger). It shall be noted that: (1) the systems and methods herein may be extended to include all drive-off scenarios (positive slope, neutral slope, and negative slope), and (2) the systems and methods herein for handling rolling may be applied or adapted for instances in which the vehicle is on a negative slope and drive-off in the reverse direction is requested (e.g., backing out of parking spot when downward facing). Drive-off in the reverse direction on a negative slope may be handled in a similar manner as drive-off in the forward direction on a positive slope. Thus, while not expressly discussed in all embodiments below, embodiments may include assessing the slope of the surface on which the AD vehicle rests and determining the drive-off direction before implementing a drive-off method that handles rolling.

FIG. 18 depicts a table of different scenarios and different corresponding applications of engine (or propulsion) torque and/or one or more braking systems, according to embodiments of the present disclosure. As illustrated, embodiments consider two main categories of factors-occupant experience or comfort 1840 and safety related 1850. It shall be noted that other categories of factors may be used, including fewer, more, or different categories. It shall be noted that other selections, arrangements, and configurations of the options may be used.

The first set of methodologies 1840 involve a vehicle in a safe setting/environment. In one or more embodiments, one or more sensors are used to assess the environment in which the vehicle is operating. For example, for the vehicle to be considered in a safe setting, it may be determined by the AD system, using inputs like sensor data, that the vehicle is on a stable road, that the road surface has good traction (i.e., there are no potential low friction issues like rain, snow, oily road surface, etc.), and that there are no objects within a defined area (e.g., no cars, bikes, pedestrians, objects, etc. that are within a set distance of the vehicle). It shall be noted that various criteria or sets of criteria may be defined for considering the vehicle to be deemed to be in a safe setting.

In one or more embodiments, if the AD system deems the vehicle to be in a safe setting and the vehicle starts to roll in a non-drive-off direction but at a very low speed (e.g., less than 1 kilometer per hour (kph)), the AD system may apply engine/propulsion torque (Option C 1815) 1841. In one or more embodiments, the AD system may have one or more formulas or tables that determine an engine torque profile for the drive-off, which may be a function of the weight of the vehicle, gradient of the vehicle as it sits on the road surface, acceptable comfort levels for acceleration, and speed at which the vehicle is rolling in a non-desired direction. In one or more embodiments, the mass/weight may be determined using one or more factors, such as previous or current torque (e.g., wheel torque needed to accelerate, braking torque needed to accelerate or decelerate, etc.). Having one or more mass/weight sensors to gauge the overall weight of the ADV and its contents (including occupants) allows the ADV to use mass and/or weight parameters for one or more determinations, such as braking, accelerating, handling, etc.

In one or more embodiments, if the AD system deems the vehicle to be in a safe setting and the vehicle starts to roll in a non-drive-off direction but at a low speed (e.g., less than 3 kph) 1842, the AD system may apply engine/propulsion torque and primary brake system braking torque (Option D 1820). The profiles for application of engine torque and the primary braking system torque may be based upon factors listed above and may include dynamically adjusting one or more of the torque profiles.

Similar to the prior methodology 1842, in one or more embodiments, if the AD system deems the vehicle to be in a safe setting and the vehicle has rolled greater than a threshold distance at a low speed (e.g., 0.6 meters) 1843, the AD system may apply engine/propulsion torque and primary brake system braking torque. The profiles for application of engine torque and the primary braking system torque may be based upon factors listed above and may include dynamically adjusting one or more of the torque profiles.

In situations in which the vehicle is considered to be in a safe setting, but it is rolling in a non-drive-off direction at a high speed (e.g., more than 5 kph) 1844, the AD system may select one or more options from a set of options. As illustrated in the table in FIG. 18, the primary brake may be applied (Option A), the secondary brake and/or EPB may be applied (Option B), engine/propulsion torque and primary brake system braking torque may be applied (Option D), or some combination thereof. The amount of braking torque and the number of braking systems that are employed may vary based on the speed, environmental conditions, gradient of the road, responsiveness of the vehicle to the applied torque(s), etc.

Finally, in the depicted embodiment in FIG. 18, if the vehicle is deemed to be on a low friction road surface (e.g., due to rain, snow, ice, etc.) 1845, the AD vehicle may select one or more options from a set of options. As illustrated in the table in FIG. 18, the primary brake may be applied (Option A 1805), the engine torque may be applied (Option D 1820), or both. The road surface may be assessed by detecting tire slipping, visual sensors, or received data (e.g., road condition data reports, traffic reports, etc.).

The next set of methodologies 1850 related to situations in which safety is an issue. In one or more embodiments, based upon vision and object detection or based upon radar or lidar data, an object is detected in close proximity behind the AD vehicle. To ensure that a collision does not occur, the AD system may cause the primary braking system (Option A) 1851 to engage. Recall that the braking system is able to quickly apply torque; thus, it can quickly arrest any rolling backward and avoid hitting the object(s) behind the vehicle.

If the vehicle is detected as operating in an unexpected way (e.g., low friction road (e.g., ABS engaged), on a road where the vehicle deviates from a straight line in which electronic stability control (ESC) has been engaged, etc.) 1852, the AD system may cause the primary braking system (Option A) to engage to bring the AD vehicle to a stop.

In one or more embodiments, if the AD system deems that the vehicle is not in a safe setting and the vehicle has rolled in a non-drive-off direction greater than a threshold distance (e.g., 0.6 meters) 1853, the AD system may apply the primary brake system (Option A) and/or the secondary brake system and/or EPB (Option B) may be applied to bring the AD vehicle to a stop.

In one or more embodiments, if the AD system deems that the vehicle is not in a safe setting and it detects one or more wheels slipping 1854, the AD system may apply the primary brake to bring the AD vehicle to a stop.

In one or more embodiments, if the AD system deems that the vehicle is rolling in a non-drive-off direction at a speed greater than a threshold high speed value (e.g., 5 kph) 1855, the AD system may primary brake system braking torque and braking from one or more other braking systems (e.g., Option B).

It should be noted that additional threshold values and prioritization may be defined for setting the order in which the systems (e.g., Options A-D) are applied. For example, the primary brake may be the first option to be applied, but if the distance moved is still too high or if the speed is still too high, the secondary braking system may then be applied. In like manner, if the distance or speed values do not reach certain levels within a defined time period (e.g., 1 second), one or more additional braking systems and/or the engine torque may be applied.

Figure 19:
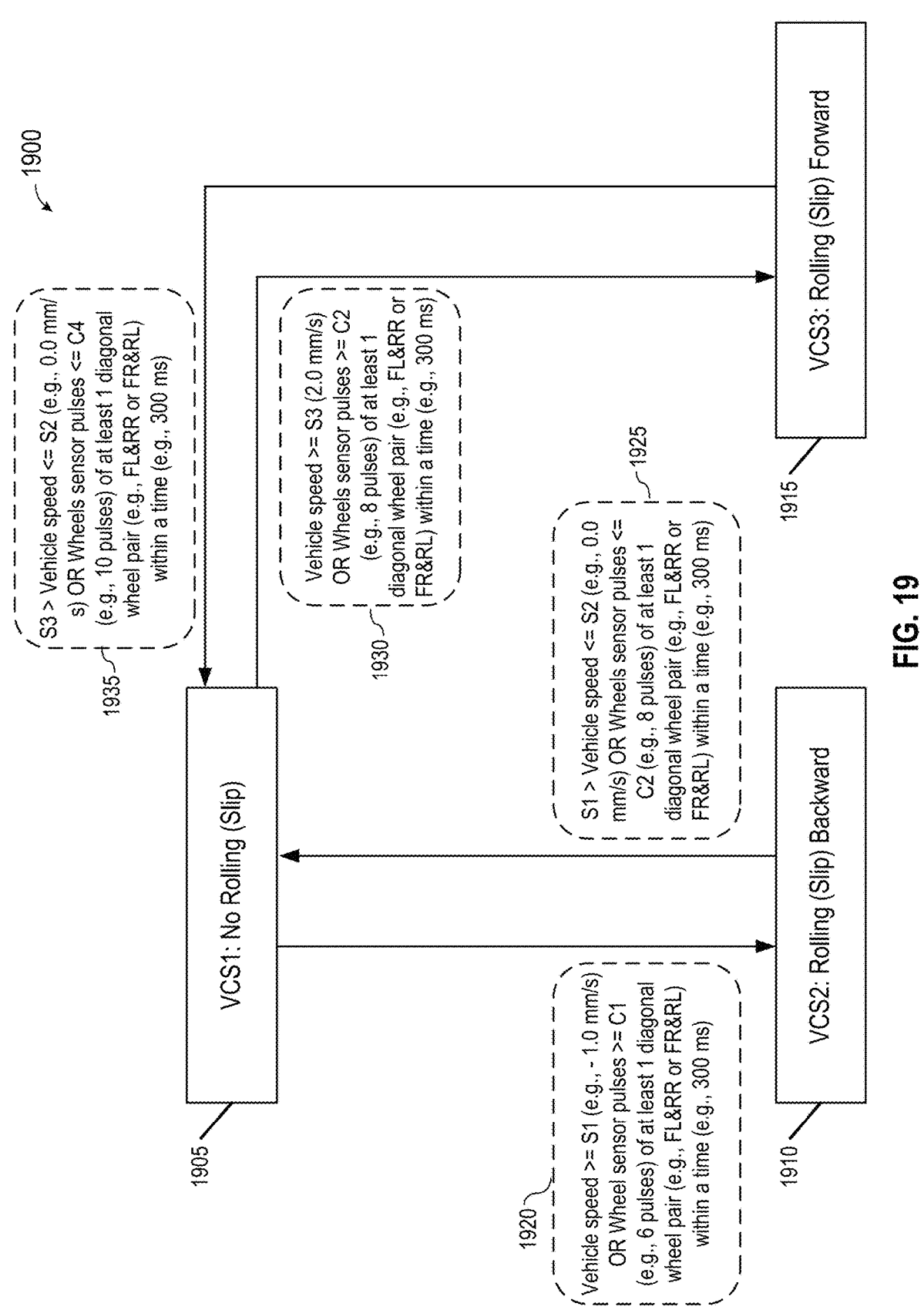
FIG. 19 depicts a state diagram of an autonomous driving vehicle for smooth drive-off, according to embodiments of the present disclosure.

FIG. 19 depicts a state diagram of an autonomous driving vehicle for smooth drive-off, according to embodiments of the present disclosure. The depicted embodiment comprises three vehicle control or condition states: VCS1 no rolling or slippage 1905, VCS2 rolling or slipping backward 1910, and VCS3 rolling or slipping forward 1915.

Starting with VCS1 1905, in which no rolling or slipping is detected, the state may change depending upon whether movement backward to VCS2 1910 or forward to VCS3 is detected.

In one or more embodiments, one or more wheel sensors may be used to detect a directional speed of the ADV. The wheel sensors may generate magnetic pulses in the form of waves, proportional to the speed of the ADV. In one or more embodiments, magnetics may be positioned around a circle that is correlated to the rotation of a wheel (e.g., around a drive shaft of the wheel or on the wheel itself). As the magnets pass by a magnetic sensor, a magnetic pulse is detected. The rate of the pulses and the number of pulses relate to speed and distance. One or more of the ADV's wheel sensors, which may be located at each of the wheels (i.e., front left (FL), front right (FR), rear left (RL), rear right (RR) wheel), may be used to detect the speed of the ADV based on pulses detected. In one or more embodiments, when at least two diagonal wheel sensors (e.g., FL & RR or FR & RL) detect pulses within a set time period, the control system may register a status or state of the ADV. One or more sensors, such as wheel sensors, may also be used to determine the distance moved while rolling. In one or more embodiments, slipping may be determined if wheels sensor pulses >=C1 (e.g., 6 pulses) with at least 1 from a diagonal wheel (FL&RR or FR&RL) within a certain amount of time (e.g., 450 ms).

It shall be noted that the embodiment of FIG. 19 may be extended to include additional or different states; for example, the ADV may be in different states based on the speed of the ADV or the amount of distance moved, and different control techniques may be applied accordingly.

State Change Condition(s) 1920: If the vehicle's speed is greater than or equal to a first speed threshold (e.g., 1 millimeter per second (mm/s)) in the backward direction or at least one diagonal pair of wheels (e.g., FL&RR or FR&RL) has sensor pulses that are greater than or equal to a first wheel sensor pulse threshold (e.g., 6 pulses) (which may be correlated to distance, speed, and/or wheel arc travelled) in a backward direction within a wheel sensor pulse time (e.g., 300 ms), the vehicle may be deemed (1920) to be in VSC2 1910—that is, rolling or slipping backward.

State Change Condition(s) 1925: Conversely, if the vehicle's speed is in a range less than the first speed threshold and greater than or equal to a second speed threshold (e.g., 0.0 millimeters per second (mm/s)) at least one diagonal pair of wheels (e.g., FL&RR or FR&RL) has sensor pulses that are less than or equal to a second wheel sensor pulse threshold (e.g., 8 pulses) within a wheel sensor pulse time (e.g., 300 ms), the vehicle may be deemed (1925) to be in VSC1 1905—that is, stationary/no rolling or slipping.

State Change Condition(s) 1930: If the vehicle's speed is greater than or equal to a third speed threshold (e.g., 2 mm/s) in the forward direction or at least one diagonal pair of wheels (e.g., FL&RR or FR&RL) has sensor pulses that are greater than or equal to a third wheel sensor pulse threshold (e.g., 8 pulses) in a forward direction within a wheel sensor pulse time (e.g., 300 ms), the vehicle may be deemed (1930)

to be in VSC2 1915—that is, rolling or slipping forward. In one or more embodiments, vehicle speed may be correlated to wheel pulses according to a formula (e.g., (number_of_pulses/total_pulses_for_one_wheel rotation)×π× D_tire_diameter) or from other devices directly like GPS.

State Change Condition(s) 1935: If the vehicle's speed is in a range less than the third speed threshold and greater than or equal to a second speed threshold (e.g., 0.0 millimeters per second (mm/s)) or at least one diagonal pair of wheels (e.g., FL&RR or FR&RL) has sensor pulses that are less than or equal to a fourth wheel sensor pulse threshold (e.g., 10 pulses) in the forward direction within a wheel sensor pulse time (e.g., 300 ms), the vehicle may be deemed (1935) to be in VSC1 1905—that is, stationary/no rolling or slipping.

In one or more embodiments, the vehicle state (e.g., VCS1, VCS2, or VCS3) may be used by one or more embodiments of the present patent document to perform one or more actions. For example, the vehicle state may be used in conjunction with the methods depicted in FIG. 18 to identify corresponding actions to take. It shall be noted that while FIG. 19 depicts three states, one skilled in the art will recognize that the state diagram 1900 may be extended to include additional states and conditions; for example, it may be extended to encompass the states and conditions corresponding those discussed relative to FIG. 18.

It shall be noted that the state diagram for handling rolling may be extended or applied for instances in which the vehicle is on a negative slope and drive-off in the reverse direction is requested (e.g., backing out of parking spot when downward facing) and when drive-off is on a neutral surface. In one or more embodiments, different state diagrams may be used based upon slope angle and drive-off direction.

In one or more embodiments, the states may correspond to rules/actions related to application of torque by one or more systems of the AD vehicle. For example, FIG. 13 depicts examples of brake torque profile 1300A and corresponding wheel torque profile 1300B, according to embodiments of the present disclosure. Thus, an action may comprise not only applying a torque (i.e., engine torque and/or wheel torque) but may comprise a torque profile. In one or more embodiments, the torque profile may be affected or adjusted by a detected state or detected data.

Figure 20:
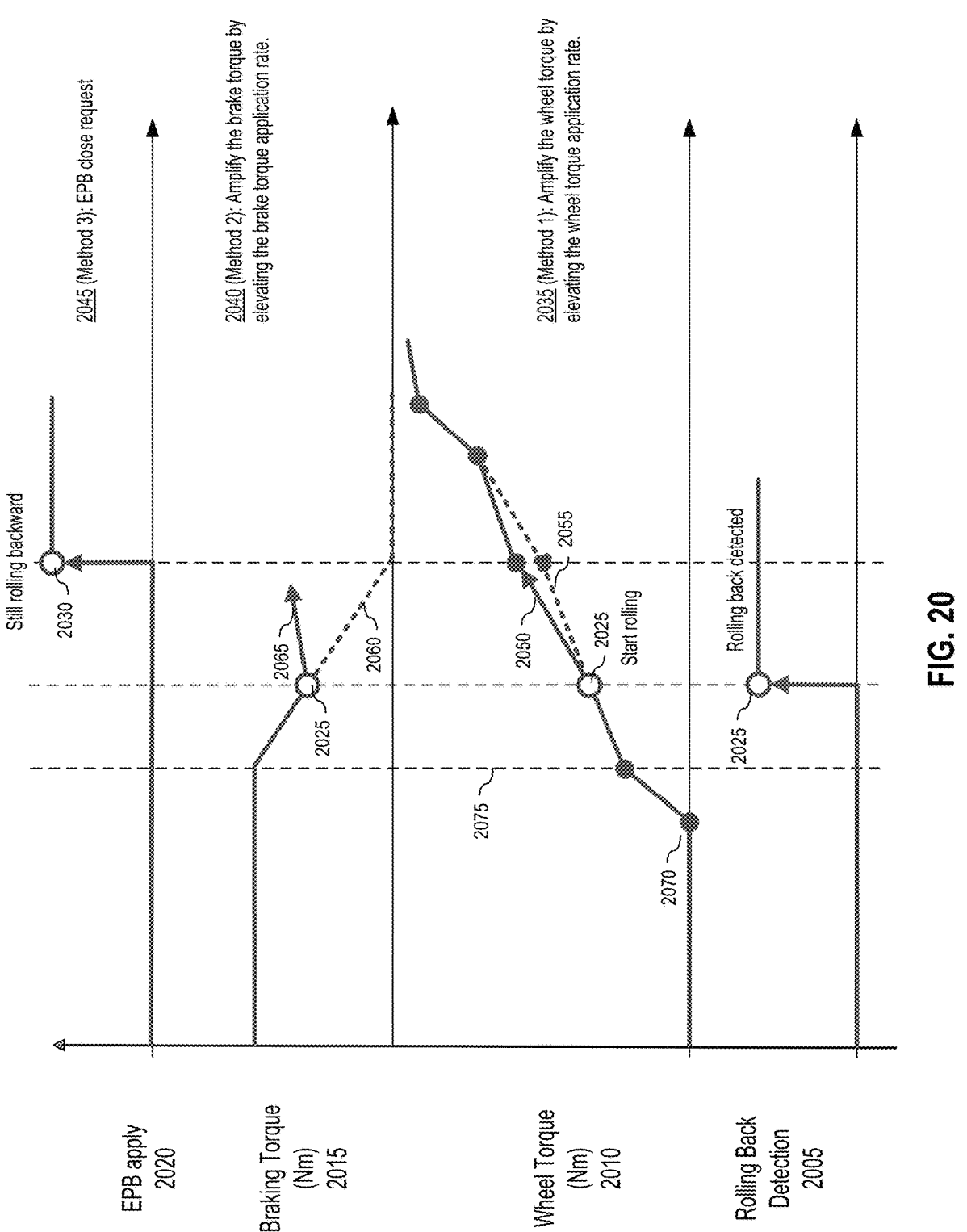
FIG. 20 depicts a set of methodologies that may be used for smooth drive-off when rolling is detected, according to embodiments of the present disclosure.

FIG. 20 depicts a set of methodologies that may be used for smooth drive-off when rolling in a non-drive-off direction is detected, according to embodiments of the present disclosure. Graphs 2010 (wheel torque profile) and 2015 (braking torque profile) are the same as or similar to the graphs in FIG. 13. As illustrated in the wheel torque graph 2010, wheel torque begins to be applied at the time indicated by point 2070. The wheel torque is increased over time until point 2075, at which point the braking torque is lessened. Unlike the embodiment depicted in FIG. 13, at the time indicated by point 2025, the vehicle is detected as rolling in a non-drive-off direction.

In one or more embodiments, one method (2035) for addressing the rolling issue is to increase the wheel torque by elevating it at a higher rate than initially set. This change in torque to compensate for the rolling is indicated in the wheel torque profile graph 2010. The dashed line 2055 indicates the original wheel torque profile that was going to be applied to the vehicle by the AD system, and line 2050 shows the adjusted wheel torque profile, in which the wheel torque has been increased to address the rolling. In one or more embodiments, the amount of adjustment may be related to one or more factors including, but not limited to, the amount of rolling that is detected (e.g., speed or distance), surroundings (e.g., a vehicle is closely behind the AD vehicle or there is nothing immediately behind the AD vehicle), vehicle weight, degree of slope (gradient) on which the vehicle sits, amount of braking torque being applied, etc. The torque profile may be dynamically determined so that the torque may be altered as the vehicle responds to the applied torque.

Additionally, or alternatively, the AD system may apply a method (2040) that increases the braking torque of one or more of the braking systems. As illustrated in graph 2015 (braking torque profile), at the point of detected rollback 2025, the AD alters the braking torque profile from the downward line 2060 that was originally going to be applied to one 2065 in which the braking torque is increased. The braking torque profile may be determined dynamically by the AD system based upon one or more factors including, but not limited to, rollback speed, rollback distance, surroundings (e.g., a vehicle is closely behind the AD vehicle or is not immediately behind the AD vehicle), vehicle weight, degree of slope (gradient) on which the vehicle sits, amount of engine torque, amount of torque applied by other braking system(s), etc.

FIG. 20 also depicts yet another methodology (2045) that may be additionally or alternatively applied, according to embodiments of the present disclosure. In embodiments in which methodology 1 (2035) and/or methodology 2 (2040) have been applied but the vehicle continues to roll in a non-drive-off direction, the EPB may be applied (see graph 2020). In one or more embodiments, the EPB may be applied and reduced similar to the original braking torque profile shown in graph 2015. The braking torque profile may be determined dynamically by the AD system based upon one or more factors including, but not limited to, rolling speed, rolled distance, surroundings (e.g., a vehicle is closely behind the AD vehicle or is not immediately behind the AD vehicle), vehicle weight, degree of slope (gradient) on which the vehicle sits, amount of engine torque, amount of torque applied by other braking system(s), etc.

Alternatively—especially if both methodology 1 (2035) and methodology 2 (2040) have been, a safety issue may be raised and the EPB may be applied to stop the vehicle.

FIG. 21 depicts a general control strategy for handling rolling when attempting a drive-off, according to embodiments of the present disclosure. The AD system initiates (2105) the drive-off under conditions in which rolling may be an issue (e.g., drive-off in a forward direction on a positive slope or drive-off in a reverse direction on a negative slope). In one or more embodiments, as the drive-off has been initiated, the AD system also implements (2110) a rolling detection using at least one of using at least one of wheel pulses, wheel speed, vehicle speed, wheel rotation, and vehicle distance. One or more values related to one or more of those metrics may be associated with one or more thresholds, and responsive to a threshold or thresholds being triggered, one or more actions may be taken (e.g., apply or remove engine torque, apply or remove braking torque from one or more braking systems, etc.).

FIG. 22 depicts a general methodology for handling rolling when attempting a drive-off, according to embodiments of the present disclosure. In one or more embodiments, the methodology starts (2205) with the vehicle being in a vehicle holding control state. For example, the vehicle may be parked or may have come to a stop at a stop sign, stop light, uncontrolled intersection, or for some other reason.

The vehicle may remain in a holding control state (i.e., a standstill) until drive-off in a first direction is requested (2210) by the AD system. While not depicted in FIG. 22, in one or more embodiments, the AD system may determine whether rolling or slipping in a direction that is not the first direction is a potential issue for drive-off (e.g., drive-off in a forward direction on a positive slope or drive-off in reverse direction on a negative slope), and responsive to rolling or slipping being a potential issue, the AD system may proceed with the methodology depicted in FIG. 22.

Once a drive-off request has been issued, the AD system may apply (2215) engine torque according to an engine torque profile or calculation and may apply braking torque or pressure according to a braking torque/pressure profile or calculation. It shall be noted that applying a torque or braking pressure may include applying no torque or braking pressure. For one or more of the profiles/calculations, data from one or more sensors or other input may be used. For example, the slope of the road on which the vehicle resides, weight, road conditions, surroundings, etc. may be used to determine the profile(s).

In one or more embodiments, the AD system monitors for movement of the vehicle during the drive-off process. For example, methods, including but not limited to those described above related to FIGS. 18 and 19, may be used to monitor conditions related to rolling back of the vehicle.

Responsive to the vehicle operating as expected and not rolling backward during the drive-off process, the AD system continues to apply the torque profile or profiles to complete the drive-off.

However, responsive to the vehicle being detected as moving in a direction other than the desired direction (e.g., rolling backward) during the drive-off process, the AD system may obtain (2225) data related to the movement and related to safety. The safety check may comprise collecting data related to one or more safety-related conditions, as each of those conditions may affect which system or systems apply torque (e.g., engine or one or more of the braking systems), how much torque to apply, and when to apply the torque. For example, if, during the drive-off process, a vehicle has approached the AD vehicle and is in close proximity to the AD vehicle, a different approach may be selected in which the smoothness of the drive-off may be traded off for moving forward to avoid a potential collision with the vehicle behind the AD vehicle. As noted above, safety-related data may include, but is not limited to, assessing or obtaining data related to road conditions, road gradient, objects around or approaching the vehicle (e.g., pedestrians, cross traffic, oncoming traffic, traffic behind the AD vehicle), weight, weather conditions, currently applied torque values, checking for an emergency vehicle, checking for accident nearby, etc. In one or more embodiments, safety checking may be continually performed or may be performed at certain intervals or instances.

As noted above, data related to the movement is also collected or obtained (2225). In one or more embodiments, data related to the movement may comprise data related to one or more wheel pulses, wheel speed, vehicle speed, amount of wheel rotation, vehicle distance moved, or a combination thereof. One or more of the pieces of obtained data may be applied to rules or tables, which may comprise one or more thresholds. One or more of the threshold values may be related to gradient, weight, acceptable level(s) of rollback, one or more other factors, or a combination thereof.

In one or more embodiments, one or more safety rules with associated thresholds may be set. For example, as depicted in FIG. 22, responsive to any of a set of safety-related conditions being met (e.g., the movement speed of the AD vehicle is above a safety speed threshold, the AD vehicle has travelled due to the movement more than a safety threshold distance, the AD vehicle experienced or is experiencing slippage above a safety slippage threshold, or the vehicle is operating in an unexpected manner), the AD system may apply one or more braking systems to bring the vehicle to a stop.

In one or more embodiments, the AD system may, if deemed safe (e.g., road conditions are acceptable, enough space between other objects/traffic, etc.), attempt driving off again and may retry the methodology of FIG. 22. In one or more embodiments, a counter may be kept and if the number of consecutive unsuccessful attempts to drive-off exceeds a threshold, one or more countermeasures may be taken. One countermeasure may be to attempt drive-off in a different direction, if safe and accessible. Additionally, or alternatively, the AD system may cause one or more alerts to be generated. The alerts may be used to trigger one or more warning signals or warning/failure signals to a user, passenger, repairman, roadside assistance, and/or remote user. Such warnings may comprise one or more media types (e.g., lights, sounds, messages, etc.). For example, a message may include a light signal, a text message, an audible signal, a tactile signal, a network message, an application message, an email, or any combination thereof. In one or more embodiments, the alert(s) may be different based on different detected failures. An alert may also trigger or be performed in conjunction with one or more actions, such sending a location of the ADV to one or more entities.

Responsive to no safety threshold being met, in one or more embodiments, the AD may use one or more pieces of the rollback-related data to update the drive-off process by altering the torque of one or more systems. For example, any of the methodologies of FIG. 18, 20, or 21 may be used to adjust the torque profiles of the engine and any of the braking systems.

D. Computing System Embodiments

In one or more embodiments, aspects of the present patent document may be directed to, may include, or may be implemented on or use one or more computing systems. An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a specialized processor-enabled computing system, a personal computer (e.g., laptop), tablet computer, mobile device (e.g., personal digital assistant (PDA), smartphone, phablet, tablet, etc.), smartwatch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read-only memory (ROM), and/or other types of memory. Additional components of the computing system may include one or more drives (e.g., hard disk drive, solid-state drive, or both), one or more network ports for communicating with external devices as well as various input and output (I/O) devices, such as a keyboard, mouse, touchscreen, stylus, microphone, camera, trackpad, display, etc. The computing system may also include one or more buses operable to transmit communications between the various hardware components.

Figure 23:
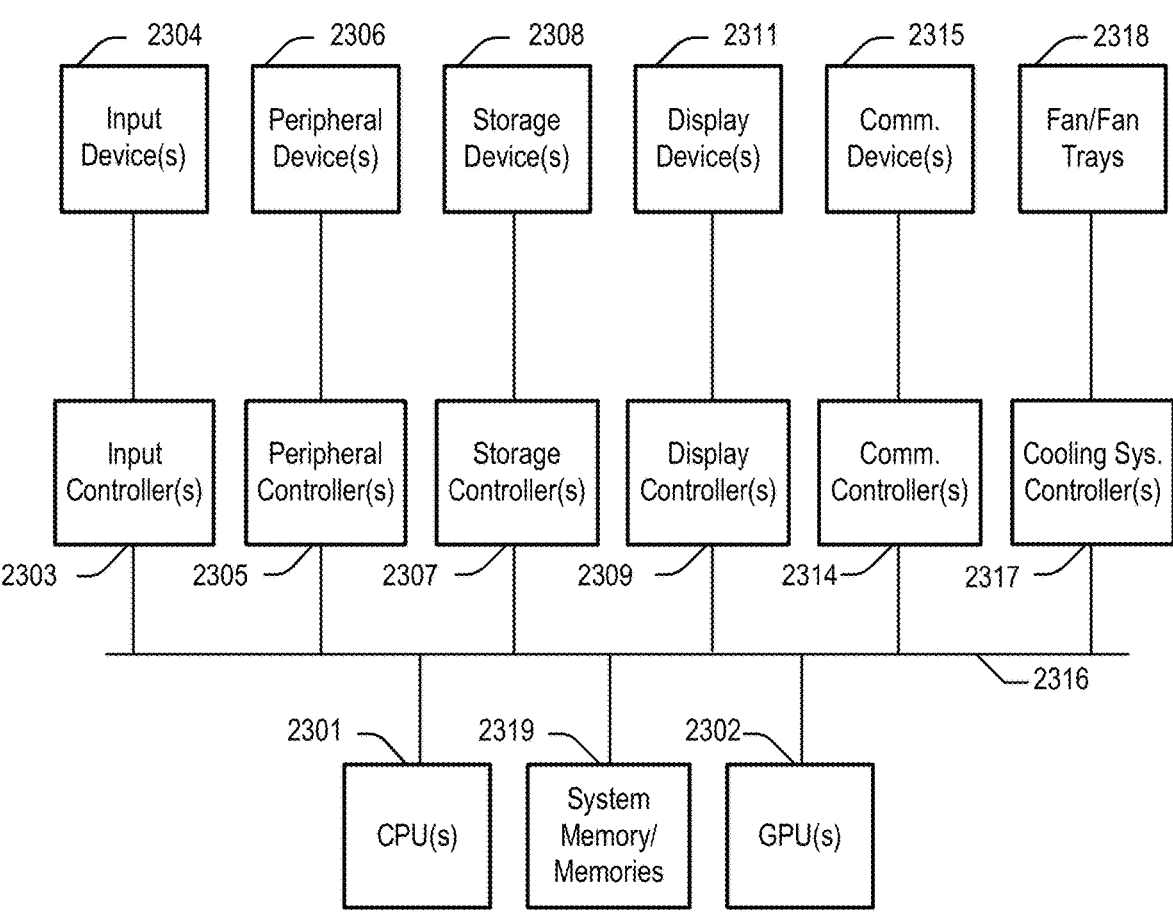
FIG. 23 depicts a simplified block diagram of a computing device, according to embodiments of the present disclosure.

FIG. 23 depicts a simplified block diagram of an information handling system (or computing system), according to embodiments of the present disclosure. It will be understood that the functionalities shown for system 2300 may operate to support various embodiments of a computing system—although it shall be understood that a computing system may be differently configured and include different components, including having fewer or more components as depicted in FIG. 23.

As illustrated in FIG. 23, the computing system 2300 includes one or more CPUs 2301 that provide computing resources and control the computer. CPU 2301 may be implemented with a microprocessor or the like, and may also include one or more graphics processing units (GPU) 2302 and/or a floating-point coprocessor for mathematical computations. In one or more embodiments, one or more GPUs 2302 may be incorporated within the display controller 2309, such as part of a graphics card or cards. The system 2300 may also include a system memory 2319, which may comprise RAM, ROM, or both.

A number of controllers and peripheral devices may also be provided, as shown in FIG. 23. An input controller 2303 represents an interface to various input device(s) 2304. The computing system 2300 may also include a storage controller 2307 for interfacing with one or more storage devices 2308 each of which includes a storage medium such as magnetic tape or disk, or an optical medium that might be used to record programs of instructions for operating systems, utilities, and applications, which may include embodiments of programs that implement various aspects of the present disclosure. Storage device(s) 2308 may also be used to store processed data or data to be processed in accordance with the disclosure. The system 2300 may also include a display controller 2309 for providing an interface to a display device 2311, which may be a cathode ray tube (CRT) display, a thin film transistor (TFT) display, organic light-emitting diode, electroluminescent panel, plasma panel, or any other type of display. The computing system 2300 may also include one or more peripheral controllers or interfaces 2305 for one or more peripherals 2306. Examples of peripherals may include one or more printers, scanners, input devices, output devices, sensors, and the like. A communications controller 2314 may interface with one or more communication devices 2315, which enables the system 2300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 2300 comprises one or more fans or fan trays 2318 and a cooling subsystem controller or controllers 2317 that monitors thermal temperature(s) of the system 2300 (or components thereof) and operates the fans/fan trays 2318 to help regulate the temperature.

In the illustrated system, all major system components may connect to a bus 2316, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable media including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that has computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CDs and holographic devices; magneto-optical media; and hardware devices that are specially configured to store or to store and execute program code, such as ASICs, PLDs, flash memory devices, other non-volatile memory devices (such as 3D XPoint-based devices), and ROM and RAM devices. Examples of computer code include machine code, such as produced by a compiler, and files containing higher-level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

Note that some or all of the components as shown and described above may be implemented in software, hardware, or a combination thereof. For example, such components can be implemented as software installed and stored in a persistent storage device, which can be loaded and executed in a memory by a processor to carry out the processes or operations described throughout this application. Alternatively, such components can be implemented as executable code programmed or embedded into dedicated hardware such as an integrated circuit (e.g., an application-specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer-readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer-readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations. The specification and drawings are, accordingly, to be regarded in an illustrative sense rather than a restrictive sense.

What is claimed is:

1. A computer-implemented method for operating an autonomous driving vehicle (ADV), the method comprising:

based upon one or more sensor inputs, responsive to a potential-rolling issue having arisen when attempting to accelerate the ADV from a standstill in a first direction, an autonomous driving (AD) system of the ADV performing steps comprising:

causing an engine of the ADV to apply torque to one or more wheels of the ADV according to an engine torque profile and causing one or more braking systems of the ADV to apply braking pressure to one or more wheels of the ADV according to a braking torque profile;

responsive to detecting, via one or more sensors, that the ADV is moving in the first direction, continuing to cause the engine to apply torque according to the engine torque profile and to cause the one or more braking systems of the ADV to apply braking pressure to one or more wheels of the ADV according to the braking torque profile; and responsive to detecting, via one or more sensors, that the ADV is experiencing a movement in a direction other than the first direction, performing steps comprising:

obtaining data related to the movement in the direction other than the first direction;

using at least some of the data related to the movement in the direction other than the first direction to determine whether a safety condition has been triggered;

responsive to a safety threshold having been triggered, updating the engine torque profile and the braking torque profile to cause the ADV to come to a stop; and responsive to a safety threshold having been triggered, updating at least one of the engine torque profile and the braking torque profile to compensate for the movement in the direction other than the first direction.

2. The computer-implemented method of claim 1 wherein:

at least one of the engine torque profile and the braking torque profile is dynamically updated by the AD system.

3. The computer-implemented method of claim 1 wherein:

responsive to coming to a stop, retrying to accelerate the ADV from a standstill.

4. The computer-implemented method of claim 1 wherein the safety condition comprises one or more of the following:

a speed in the direction other than the first direction as detected by the AD system is greater than a safety speed threshold;

a distance travelled in the direction other than the first direction as detected by the AD system is greater than a safety distance threshold; and movement of the ADV in an unexpected manner.

5. The computer-implemented method of claim 1 wherein the step of updating at least one of the engine torque profile and the braking torque profile to compensate for the movement in the direction other than the first direction comprises:

using at least part of the data to correlate one or more updates for the engine torque profile, the brake torque profile, or both.

6. The computer-implemented method of claim 1 wherein the step of updating at least one of the engine torque profile and the braking torque profile to compensate for the movement in the direction other than the first direction comprises:

causing the one or more braking systems to start to apply braking torque to one or more of the wheels of the ADV or to stop applying braking torque to one or more of the wheels of the ADV based upon an applied profile determined by the AD system.

7. The computer-implemented method of claim 1 further comprising:

determining at least part of the engine torque profile, at least part of the brake torque profile, or at least part of their combination using one or more parameters.

8. The computer-implemented method of claim 7 wherein:

the one or more parameters comprise a weight value assigned to the ADV and a degree of a positive slope of a surface on which the ADV resides.

9. A system comprising:

one or more processors; and a non-transitory computer-readable medium or media comprising one or more sets of instructions which, when executed by at least one of the one or more processors, causes steps to be performed comprising:

based upon one or more sensor inputs, responsive to a potential-rolling issue having arisen when attempting to accelerate the ADV from a standstill in a first direction, an autonomous driving (AD) system of the ADV performing steps comprising:

causing an engine of the ADV to apply torque to one or more wheels of the ADV according to an engine torque profile and causing one or more braking systems of the ADV to apply braking pressure to one or more wheels of the ADV according to a braking torque profile;

responsive to detecting, via one or more sensors, that the ADV is moving in the first direction, continuing to cause the engine to apply torque according to the engine torque profile and to cause the one or more braking systems of the ADV to apply braking pressure to one or more wheels of the ADV according to the braking torque profile; and responsive to detecting, via one or more sensors, that the ADV is experiencing a movement in a direction other than the first direction, performing steps comprising:

obtaining data related to the movement in the direction other than the first direction;

using at least some of the data related to the movement in the direction other than the first direction to determine whether a safety condition has been triggered;

responsive to a safety threshold having been triggered, updating the engine torque profile and the braking torque profile to cause the ADV to come to a stop; and responsive to a safety threshold having been triggered, updating at least one of the engine torque profile and the braking torque profile to compensate for the movement in the direction other than the first direction.

10. The system of claim 9 wherein:

at least one of the engine torque profile and the braking torque profile is dynamically updated by the AD system.

11. The system of claim 9 wherein the non-transitory computer-readable medium or media further comprises one or more sets of instructions which, when executed by at least one of the one or more processors, causes steps to be performed comprising:

responsive to coming to a stop, retrying to accelerate the ADV from a standstill.

12. The system of claim 9 wherein the safety condition comprises one or more of the following:

a speed in the direction other than the first direction as detected by the AD system is greater than a safety speed threshold;

a distance travelled in the direction other than the first direction as detected by the AD system is greater than a safety distance threshold; and movement of the ADV in an unexpected manner.

13. The system of claim 9 wherein the step of updating at least one of the engine torque profile and the braking torque profile to compensate for the movement in the direction other than the first direction comprises:

using at least part of the data to correlate one or more updates for the engine torque profile, the brake torque profile, or both.

14. The system of claim 9 wherein the step of updating at least one of the engine torque profile and the braking torque profile to compensate for the movement in the direction other than the first direction comprises:

causing the one or more braking systems to start to apply braking torque to one or more of the wheels of the ADV or to stop applying braking torque to one or more of the wheels of the ADV based upon an applied profile determined by the AD system.

15. The system of claim 9 wherein the non-transitory computer-readable medium or media further comprises one or more sets of instructions which, when executed by at least one of the one or more processors, causes steps to be performed comprising:

determining at least part of the engine torque profile, at least part of the brake torque profile, or at least part of their combination using one or more parameters.

16. A non-transitory computer-readable medium or media comprising one or more sequences of instructions which, when executed by at least one processor, causes steps to be performed comprising:

based upon one or more sensor inputs, responsive to a potential-rolling issue having arisen when attempting to accelerate the ADV from a standstill in a first direction, an autonomous driving (AD) system of the ADV performing steps comprising:

causing an engine of the ADV to apply torque to one or more wheels of the ADV according to an engine torque profile and causing one or more braking systems of the ADV to apply braking pressure to one or more wheels of the ADV according to a braking torque profile;

responsive to detecting, via one or more sensors, that the ADV is moving in the first direction, continuing to cause the engine to apply torque according to the engine torque profile and to cause the one or more braking systems of the ADV to apply braking pressure to one or more wheels of the ADV according to the braking torque profile;

responsive to detecting, via one or more sensors, that the ADV is experiencing a movement in a direction other than the first direction, performing steps comprising:

obtaining data related to the movement in the direction other than the first direction;

using at least some of the data related to the movement in the direction other than the first direction to determine whether a safety condition has been triggered;

responsive to a safety threshold having been triggered, updating the engine torque profile and the braking torque profile to cause the ADV to come to a stop; and responsive to a safety threshold having been triggered, updating at least one of the engine torque profile and the braking torque profile to compensate for the movement in the direction other than the first direction.

17. The non-transitory computer-readable medium or media of claim 16 wherein:

at least one of the engine torque profile and the braking torque profile is dynamically updated by the AD system.

18. The non-transitory computer-readable medium or media of claim 16 further comprising one or more sequences of instructions which, when executed by at least one processor, causes steps to be performed comprising:

responsive to coming to a stop, retrying to accelerate the ADV from a standstill.

19. The non-transitory computer-readable medium or media of claim 16 wherein the safety condition comprises one or more of the following:

a speed in the direction other than the first direction as detected by the AD system is greater than a safety speed threshold;

a distance travelled in the direction other than the first direction as detected by the AD system is greater than a safety distance threshold; and movement of the ADV in an unexpected manner.

20. The non-transitory computer-readable medium or media of claim 16 wherein the step of updating at least one of the engine torque profile and the braking torque profile to compensate for the movement in the direction other than the first direction comprises:

using at least part of the data to correlate one or more updates for the engine torque profile, the brake torque profile, or both.

* * * * *